United States Patent
Ungar et al.

(10) Patent No.: US 11,301,610 B2
(45) Date of Patent: Apr. 12, 2022

(54) METHODS FOR MODELING OF A DESIGN IN RETICLE ENHANCEMENT TECHNOLOGY

(71) Applicant: D2S, Inc., San Jose, CA (US)

(72) Inventors: P. Jeffrey Ungar, Belmont, CA (US); Hironobu Matsumoto, Kanagawa (JP)

(73) Assignee: D2S, Inc., San Jose, CA (US)

( * ) Notice: Subject to any disclaimer, the term of this patent is extended or adjusted under 35 U.S.C. 154(b) by 0 days.

(21) Appl. No.: 17/248,325

(22) Filed: Jan. 20, 2021

(65) Prior Publication Data
US 2021/0141988 A1     May 13, 2021

Related U.S. Application Data

(63) Continuation-in-part of application No. 15/930,774, filed on May 13, 2020, now Pat. No. 10,909,294, which is a continuation of application No. 15/853,311, filed on Dec. 22, 2017, now Pat. No. 10,657,213.

(51) Int. Cl.
| | |
|---|---|
| *G06F 30/39* | (2020.01) |
| *G03F 7/20* | (2006.01) |
| *G03F 1/44* | (2012.01) |
| *G03F 1/36* | (2012.01) |
| *G06F 119/18* | (2020.01) |

(52) U.S. Cl.
CPC .............. *G06F 30/39* (2020.01); *G03F 1/36* (2013.01); *G03F 1/44* (2013.01); *G03F 7/705* (2013.01); *G06F 2119/18* (2020.01)

(58) Field of Classification Search
USPC ......................................................... 716/51
See application file for complete search history.

(56) References Cited

U.S. PATENT DOCUMENTS

| | | | |
|---|---|---|---|
| 7,716,627 B1 | 5/2010 | Ungar et al. | |
| 7,856,612 B1 | 12/2010 | Ungar et al. | |
| 2005/0149900 A1 | 7/2005 | Laidig | |
| 2007/0184357 A1 | 8/2007 | Abrams et al. | |
| 2009/0077527 A1 | 3/2009 | Gergov et al. | |
| 2010/0153903 A1 | 6/2010 | Inoue et al. | |
| 2011/0004856 A1 | 1/2011 | Granik et al. | |

(Continued)

FOREIGN PATENT DOCUMENTS

| | | |
|---|---|---|
| JP | 2007108508 A | 4/2007 |
| JP | 2009004699 A | 1/2009 |

OTHER PUBLICATIONS

International Search Report dated Apr. 26, 2019 for PCT Patent Application No. PCT/US2018/065272.

(Continued)

*Primary Examiner* — Mohammed Alam
(74) *Attorney, Agent, or Firm* — MLO, a professional corp.

(57) ABSTRACT

Methods for iteratively optimizing a two-dimensioned tiled area such as a lithographic mask include determining a halo area around each tile in the tiled area. An extended tile is made of a tile and a halo area. Each extended tile in the tiled area is iterated until a criterion is satisfied or a maximum number of iterations is met. Optimizing the extended tile produces a pattern for the tile such that at a perimeter of the tile, the pattern matches adjacent patterns that are calculated at perimeters of adjacent tiles.

12 Claims, 20 Drawing Sheets

(56) References Cited

U.S. PATENT DOCUMENTS

2019/0146455 A1\* 5/2019 Beylkin ................ G06F 30/392
                                                          700/97
2019/0197213 A1\* 6/2019 Ungar ..................... G06F 30/39
2021/0141988 A1\* 5/2021 Ungar ....................... G03F 1/36

OTHER PUBLICATIONS

Notice of Allowance dated Jan. 15, 2020 for U.S. Appl. No. 15/853,311.
Office Action dated Aug. 30, 2019 for U.S. Appl. No. 15/853,311.
Office Action dated Nov. 29, 2019 for U.S. Appl. No. 15/853,311.

\* cited by examiner

TARGET PATTERN (GEOMETRY) 921

TARGET WAFER PATTERN FSA 931

CTM (INITIAL MASK) 941

INITIAL PREDICTED PATTERN FSA VERSUS TARGET WAFER PATTERN FSA 951

951A

951B

REVISED CTM (IMPROVED MASK) 991

REVISED PREDICTED PATTERN FSA VS TARGET WAFER PATTERN FSA 952

952A, 952B

METHODS FOR MODELING OF A DESIGN IN RETICLE ENHANCEMENT TECHNOLOGY

RELATED APPLICATIONS

The present application is a continuation-in-part of U.S. patent application Ser. No. 15/930,774, filed on May 13, 2020 and entitled "Modeling of a Design in Reticle Enhancement Technology; which is a continuation of U.S. patent application Ser. No. 15/853,311, filed on Dec. 22, 2017, issued as U.S. Pat. No. 10,657,213 and entitled "Modeling of a Design in Reticle Enhancement Technology"; which are hereby incorporated by reference in their entirety.

BACKGROUND

Submicron manufacturing uses lithographic techniques to build up layers of materials on a substrate to create transistors, diodes, light-emitting diodes (LEDS), capacitors, resistors, inductors, sensors, wires, optical wires, microelectromechanical systems (MEMS) and other elements which collectively produce a device that serves some function. Substrate lithography is a printing process in which a mask, sometimes called a reticle, is used to transfer patterns to a substrate to create the device. In the production or manufacturing of a device, such as an integrated circuit or a flat panel display, substrate lithography may be used to fabricate the device. When the device to be created is an integrated circuit, typically the substrate is a silicon wafer. In creating an integrated circuit, the lithography is semiconductor lithography, which for high volume production is typically a substrate lithography. Other substrates could include flat panel displays, liquid panel displays, masks for flat panel displays, nanoimprint masters, other substrates, or even other masks.

In semiconductor lithography, the mask or multiple masks may contain a circuit pattern corresponding to an individual layer, or a part of a layer in multiple patterning processes, of the integrated circuit. This pattern can be imaged onto a certain area on the substrate that has been coated with a layer of radiation-sensitive material known as photoresist or resist. Once the patterned layer is transferred the layer may undergo various other processes such as etching, ion-implantation (doping), metallization, oxidation, and polishing. These processes are employed to finish an individual layer in the substrate. If several layers are required, then the whole process or variations thereof will be repeated for each new layer. Eventually, a combination of multiples of devices, which may be integrated circuits, will be present on the substrate. These devices may then be separated from one another by dicing or sawing and then may be mounted into individual packages.

Optical lithography may be 193 nm light, with or without immersion, or extreme ultraviolet (EUV) or X-ray lithography, or any other frequencies of light or any combination thereof.

Optical lithography that uses 193 nm light waves works with refractive optics and transmissive photomasks or reticles. The masks block, partially block, or transmit the light waves selectively on to a substrate, which is typically resist-coated during the lithographic process, to partially expose or to expose different parts of the substrate or some material on the substrate. The masks are typically at 4× magnification of the target substrate dimensions.

Extreme Ultraviolet Lithography (EUV) uses approximately 13.5 nm wavelength of light with reflective optics. Some implementations use an anamorphic mask with magnifications of 8× in one dimension and 4× in the other dimension.

In general, smaller wavelengths of light are able to resolve finer geometries, finer spaces in between geometries, and a higher frequency (density) of features on the substrate. Also in general, smaller wavelengths of light are more difficult to reliably produce and control. Economically, it is best to use the largest wavelength of light that is able to resolve the feature sizes, spaces, and frequencies that are needed for the device. It is therefore of interest to enhance the resolution achievable on the substrate with any given wavelength(s) of light.

For any lithography of a particular resolution, additional techniques such as off-axis illumination, phase shift masks, and multiple patterning extend the resolution capabilities. When multiple patterning is used, a single substrate layer is exposed multiple times, each time using a different mask which is called a mask layer.

Masks are created by electron beam (eBeam) machines, which shoot electrons at a photo resist coating a surface, which is then processed to produce the desired openings in the mask. The amount of energy delivered to a spot on the mask is called the dose, which may have no energy at a dose set to 0.0 and a nominal dose set to 1.0 by convention. A pattern will be registered when the dose exceeds a certain threshold, which is often near 0.5 by convention. Critical dimension (CD) variation is, among other things, inversely related to the slope of the dosage curve at the resist threshold, which is called edge slope, or dose margin.

There are a number of charged particle beam technologies. Three common types of charged particle beam lithography are variable shaped beam (VSB), character projection (CP), and multi-beam projection (MBP). The most commonly used system for leading edge mask production is VSB. VSB and CP are sub-categories of shaped beam charged particle beam lithography, in which an electron beam is shaped by a series of apertures and steered to expose a resist-coated surface. MBP uses plurality of charged particle beams, whereas VSB and CP machines typically have a single beam.

It is difficult to print features whose size is similar to or smaller than the wavelength of the light used for lithography. The industry has applied various techniques to address the difficulty of reliably printing a desired shape on the substrate. A computational lithography field has emerged to use computing to enhance the substrate lithography, which in semiconductor lithography is also referred to as wafer lithography. Reticle Enhancement Technology (RET) includes computational methods and systems to design the target reticle shapes with which to project the desired pattern on the substrate more precisely and more reliably across manufacturing variation. RET often uses computation to enhance an image on a mask, to print a desired substrate pattern more accurately and more reliably with resilience to manufacturing variation. The two common techniques in RET are Optical Proximity Correction (OPC) and Inverse Lithography Technology (ILT). OPC and ILT are often iterative optimization algorithms that adjust parameters defining the mask until the predicted pattern on wafer is within acceptable tolerances for a set or a range of conditions. OPC manipulates mask geometries and simulates the wafer pattern near target edges. ILT manipulates the mask transmission as pixels, and ILT typically simulates the entire wafer pattern, a process known as dense simulation. An iterative optimization algorithm typically consists of: (1) evaluate a proposed solution to assign a cost which is trying to be minimized; (2) if cost is below a cost criteria, stop; (3) calculate a gradient for each element of the proposed solution which would lead to a lower cost; (4) adjust the proposed solution according to the calculated gradients; (5) go back to (1). Costs are typically defined with positive values where zero is the best possible score as assumed here. However, alternative cost definitions may be used.

RET in general means to improve the printability of all desired features at nominal (expected) manufacturing conditions and within expected manufacturing variation around the nominal manufacturing conditions. Since manufacturing processes are not perfect, the design needs to be resilient to certain expected manufacturing variation. A larger process window means more resiliency to manufacturing variation, specifically that pattern discrepancies through defocus and dose variation are within an acceptable tolerance. Providing sufficient process window for as many of the features as possible is a goal of RET. The percentage of chips that function as specified after fabrication is often referred to as the yield. Many factors affect yield. Improving the process window is generally considered among those skilled in the art to correlate to improving yield.

SUMMARY

In some embodiments of methods for iteratively optimizing a proposed lithographic mask, a pre-determined maximum number of iterations is input. The proposed lithographic mask is divided into a plurality of proposed mask tiles. For each proposed mask tile in the plurality of proposed mask tiles, a halo area around the proposed mask tile is determined, where the halo area comprises portions of adjacent proposed mask tiles, and where the proposed mask tile including the halo area comprise an extended tile (i.e., an extended tile is made of a mask tile and its halo area). The extended tile is iteratively optimized, where each iteration includes 1) performing one iteration of optimization for the extended tile; and 2) repeating step 1) if (i) the extended tile after performing step 1) does not satisfy a cost criteria, and (ii) a number of iterations for the extended tile is less than the pre-determined maximum number of iterations. Optimizing the extended tile produces a predicted substrate pattern at a perimeter of the proposed mask tile that matches adjacent predicted substrate patterns that are calculated at perimeters of adjacent proposed mask tiles. After completing the iterative optimizing for the plurality of proposed masked tiles, the plurality of proposed mask tiles is combined into an optimized proposed mask. Some embodiments include repeating the steps of inputting the maximum number of iterations, iteratively optimizing the extended tile, and combining the plurality of proposed mask tiles in order to refine optimization.

In some embodiments of methods of iterative processing for a two-dimensional tiled area, a pre-determined maximum number of iterations is input. A halo area around each tile in the tiled area is determined, where the halo area comprises portions of adjacent tiles, and where the tile and the halo area comprise an extended tile. The methods also include iterating calculation of a pattern for the extended tile, ensuring the pattern is correct at the perimeter of the tile for the pre-determined maximum number of iterations. Each iteration comprises 1) performing one iteration of the calculations of the pattern for the extended tile; and 2) repeating step 1) if the calculated pattern does not satisfy a pre-determined criterion and if a number of iterations for the extended tile is less than the pre-determined maximum number of iterations. After completing the iterating for all the tiles in the tiled area, the calculated patterns for all the tiles are combined.

BRIEF DESCRIPTION OF THE DRAWINGS

FIG. 6 demonstrates the capturing of the smooth function and then the reconstruction. Reconstruction allows the embodiments to calculate values for a smooth function at a finer granularity than the sampling rate.

DETAILED DESCRIPTION OF THE EMBODIMENTS

In this disclosure, use of the term wafer lithography shall refer to substrate lithography in general. That is, embodiments shall be described in terms of semiconductor lithography as an example to simplify comprehension, but the embodiments apply also to other types of substrate lithography and to overall reticle enhancement technology. The term "substrate" in this disclosure can refer to a mask used in lithography, a silicon wafer, a flat panel display, a liquid panel display, a mask for flat panel display, nanoimprint masters, or other substrates, or other masks.

The present disclosure describes iterative methods for optimizing a pattern on a substrate. The pattern may be divided into tiles and optimized for an entire design. Optimizations for all tiles may be calculated on multiple compute nodes of a high-performance computing cluster (HPC cluster) at once, or tile-by-tile on a single computing node on conventional computing platforms without detectable stitching errors.

Conventional Techniques

Figure 1:
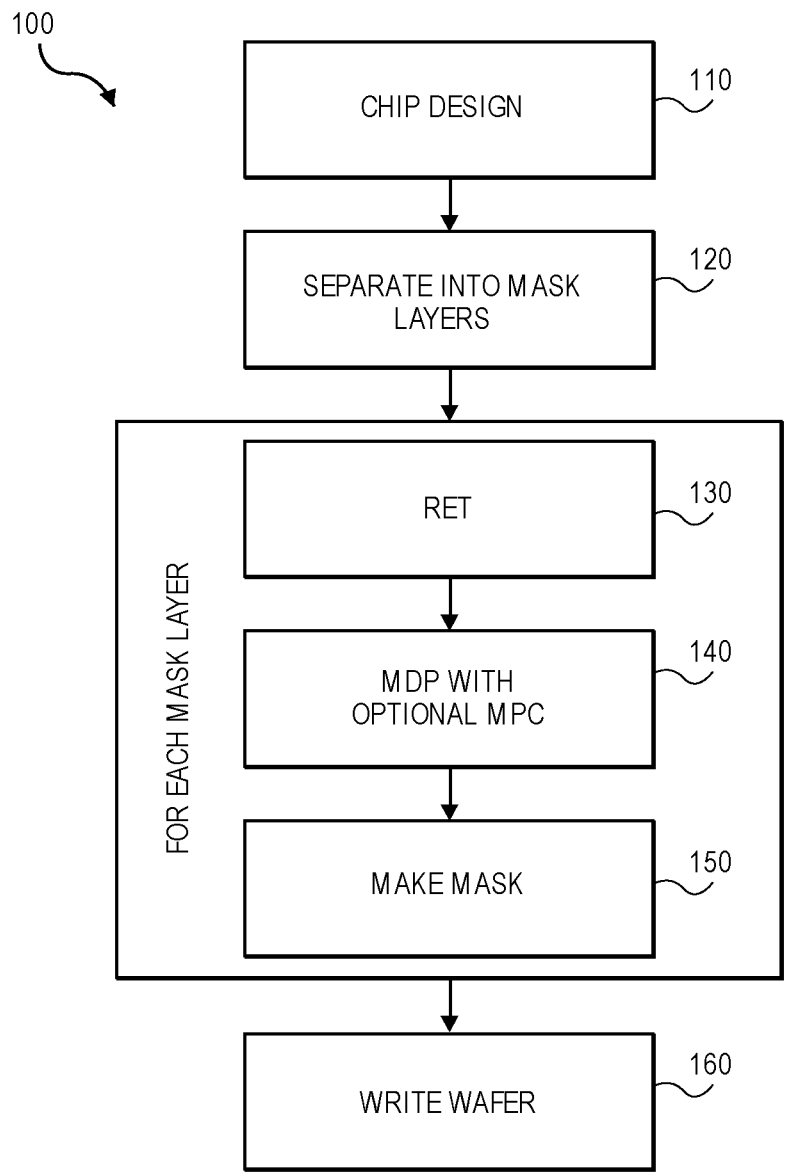
FIG. 1 is a block diagram of a chip design being processed into a wafer, as known in the art.

Traditional semiconductor manufacturing flow, 100, is depicted in FIG. 1. Chip design is accomplished by creating a composite of wafer layers in step 110. In step 120, some of the wafer layers are separated into mask layers. This step also includes what is sometimes referred to as the coloring step, where each feature on a wafer layer is colored to reflect the assignment of a feature to a particular mask layer. Once the mask layers are separately identified, each mask layer goes through the RET step 130. Mask data preparation (MDP) step 140 then prepares the data for a mask writer. This step may include "fracturing" the data into trapezoids, rectangles, or triangles. Mask Process Correction (MPC) geometrically modifies the shapes and/or assigns dose to the shapes to make the resulting shapes on the mask closer to the desired shape. MPC is sometimes performed in step 130, sometimes in step 140, sometimes in step 150, and sometimes in any combination. Pixel-level dose correction (PLDC) may also be applied in step 150. A mask is made and verified in step 150, which includes such steps as mask writing, mask inspection, metrology, mask defect disposition, mask repair, and wafer-plane inspection of the mask. In step 160, the wafer is written using a successive collection of the masks made in step 150.

In each of the steps in FIG. 1, there may or may not be a verification step to thoroughly verify or sanity check the output of that step. In the art, some of the steps of FIG. 1 are performed in a different sequence or in parallel. An example of a pipelined processing in a semiconductor manufacturing process is when a design is divided into multiple tiles, for example an array of equal-sized tiles, and then a first step is performed for a tile, and then a second step is performed for that tile without waiting for the other tiles to finish the first step. For example, RET step 130 and MDP step 140 may be pipelined to reduce the turnaround time. In another example, the MPC of step 140 may be pipelined with the mask making of step 150.

In wafer lithography, features that are needed on the substrate, referred to as main features, are found to print with greater fidelity and improved process window if extra features are added to the mask that are too small to print themselves, but nevertheless favorably affect the way nearby main features print. These extra features are called sub-resolution assist features (SRAFs). They are isolated shapes, unattached to a main feature, which are small enough not to print on the substrate.

Computing SRAFs and main feature modifications is highly compute-intensive with fragile results. Spurious extra patterns may print, the target pattern may not be fitted well, and the process window may be needlessly limited. A typical RET method has OPC verification to identify and correct hot spots. A hot spot is an area requiring ideal conditions to print properly and therefore is not resilient to manufacturing variation, or in some cases would not print properly even in ideal conditions. Hot spots lead to poor yield.

ILT often generates surprising mask patterns which provide excellent results. ILT algorithms naturally create curvilinear shapes including many SRAFs. These patterns have proven to be impractical for variable shaped beam (VSB) mask writing machines with conventional fracturing because there is too much geometry to be handled. Mask write times are a critical business factor, and VSB writing scales with the number of VSB shots that need to be printed. ILT algorithms therefore spend considerable runtime to convert the curvilinear shapes into an approximation that is more suitable for VSB writing, often referred to as Manhattanization. Model-based mask data preparation using overlapping shots can significantly reduce the write time impact. But still, curvilinear shapes take longer to write. The recently introduced multi-beam electron-beam mask writing systems write curvilinear shapes directly on a mask without taking any additional time. This enables ILT to output curvilinear shapes without the need for Manhattanization. The remaining problem with ILT is the huge computational demands of dense simulations of full mask layers of full designs, particularly full-reticle sized designs, which for semiconductor manufacturing is typically around 3.0 cm×2.5 cm in wafer dimensions.

Multi-beam writing eliminates the need to Manhattanize curvilinear shapes for VSB writing. But mask printability and resilience to manufacturing variation are still important considerations for mask shapes output by ILT. For example, shapes that are too small or too close to each other, or that have too sharp a turn in the contours of the shapes make it too difficult to make the masks reliably, especially across manufacturing variation.

The energy delivered by the electrons using charged particle beam technologies is often approximated as a point-spread function (PSF). While there are many effects that affect how the energy is spread, in charged particle beam mask making either for variable shaped beam or for multi-beam writing, a monotonic continuous PSF is a reasonable representation of the energy distribution. In this disclosure, for ease of comprehension, a simple single Gaussian distribution will be used as the PSF, but the embodiments apply to any suitable PSF.

When the energy is delivered across a big enough area at unit dose in a Gaussian distribution, there is ample dose for the interior of the area to reach unit dose. But if the area is small, the highest dose in the interior of the area does not reach unit dose. Similarly, if the spacing between areas is large enough, the lowest dose reaches zero. But if the spacing is small, the lowest dose does not reach zero. When either the area or the spacing between the areas is small, the dose profile is shallow. Mask manufacturing processes are designed to provide ample dose margin for a reasonable area and spacing, say 100 nm lines separated by 100 nm spaces with unit dose for a typical leading-edge mask for 193i lithography. Smaller areas and spacings have lower dose margin at the contour edges of the areas. The smaller the area, the worse the dose margin, if the dose applied is unit dose.

Dose margin also becomes worse for a typical mask writing process because of proximity effect correction (PEC). Mask writing with charged particle beam technologies, whether VSB, CP, or MBP, has a backscatter effect that is well known in the art. Electrons hit the resist surface, and secondary electrons released by the electrons bounce around to expose the resist in a 10-micrometer scale area around the exposed location. This has the effect of scattering, a long-range effect, and thereby partially exposing the resist in the surrounding 10 micrometer scale area. The aggregate of these partial exposures from all exposures surrounding a given area is significant enough to require correction. Software-based correction for backscatter and other long-range effects is called PEC and is typically applied in line with the mask writer at the time of mask writing. PEC in essence decreases the unit dose of a shot (or a pixel in the case of MBP) to compensate for the aggregate pre-dosing from the surrounding shots (or pixels). Nearly all production masks are written with PEC turned on in the machine. When the dose density of a 10-micrometer scale area is high, the amount of PEC applied is also high. This has the effect of reducing the height of the Gaussian (or PSF) of the exposure, and therefore reduces dose margin at the contour edges in that dense area. Therefore, a small shape written in an area of high dose density has worse dose margin than the same sized shape written in an area of low dose density.

Dose margin matters because a shallow slope means that a given percent dose change results in a larger difference in CD. Since dose margin is known by those skilled in the art to be a good proxy for a large variety, if not majority, of sources of manufacturing variation, measuring CD variation against dose variation is an important measure of resilience to manufacturing variation.

MPC may manipulate shapes or doses applied to the mask in order to correct for linearity and enhance critical dimension uniformity (CDU) and line-edge roughness (LER) among other measures of resilience to manufacturing variation. Improving CDU and LER include enhancing dose margin, and improving the uniformity of dose margin across features in the mask. Enhancement of dose margin (edge slope) is disclosed in U.S. Pat. No. 8,473,875, "Method and System for Forming High Accuracy Patterns Using Charged Particle Beam Lithography", which is owned by the assignee of the present application. For masks to be written with VSB or CP writers, reduction in CD split also improves CDU. A CD split is created when more than one shot is used to define the opposite edges of a critical dimension feature. An example of CD split is disclosed in U.S. Pat. No. 8,745,549, "Method and System for Forming High Precision Patterns Using Charged Particle Beam Lithography", which is owned by the assignee of the present application. In some embodiments MPC may be performed offline, pipelined, or in line with the mask writer.

In a typical semiconductor manufacturing process, RET of step 130 in FIG. 1 produces a mask pattern. A mask representation may not automatically satisfy all desired mask constraints and characteristics, such as allowed transmission values, minimum feature size, minimum spacing, or sufficient dose margin, therefore an evaluation of a mask's suitability needs to introduce terms that add a cost related to the violation of these constraints. In the field of inverse problems, introducing these terms is known as regularization, and is a means of selecting a solution from a potentially infinite set of solutions that fits the desired outcome equally or similarly well. However, the selected solution must also have other a priori desirable properties. An example of inverse modeling for a mask is Fourier-ILT as disclosed in U.S. Pat. No. 7,856,612, "Lithography Mask Design Through Mask Functional Optimization and Spatial Frequency Analysis," which is owned by the assignee of the present disclosure and is hereby incorporated by reference. Some aspects of the present disclosure extend on Fourier-ILT and other RET systems and methods.

Semiconductor manufacturing and submicron manufacturing in general have followed Moore's Law, which predicts that the manufacturing infrastructure advances together to allow the resolution to improve at a relatively predictable and steady rate over time. An important aspect of Moore's Law is that computational capabilities of the infrastructure scale along with Moore's Law because effects relative to power consumption and cost—such as computing bandwidth, computing speed, memory capacity, memory access speeds, communication bandwidth, communication speed, long-term storage (whether solid-state or hard-disk) capacity and speed—also scale with Moore's Law. Introduction of new manufacturing technologies such as EUV lithography or MBP-based mask writing create a discontinuity in the computing requirements. Introduction of new computational technologies such as graphical processing unit (GPU) acceleration also create discontinuity in the computing capabilities and scalability.

Computational algorithms are generally worse than linear on complexity of the design. This means that computing a tile with 1000 elements will generally take more than twice the computing needed for a tile with 500 elements. Depending on how much longer it takes to compute a tile with 1000 elements, it may be faster to divide it into two 500 element tiles and then "stitch" them back together to form the 1000 element tile. Dividing and stitching may have complications depending on the computational task and the interaction between the tiles. There is a complex tradeoff that determines the right tile size for most efficient computing. This effect is exacerbated when the amount of memory required to store sufficient information for the design far exceeds the amount of memory available on an economically feasible computing system. In data processing for chip design or chip manufacturing, or generally any device design or device manufacturing of submicron devices, full chip designs, or more generally full-scale devices, most computational steps need to be divided into much smaller tiles. This is because both the amount of data that needs computing and the capacity of computing scales along with Moore's Law. The results are then "stitched" back together both for processing by the next step and also for error and data reporting. This is called tile-based computing. The tiles are typically rectangular but may be hexagonal or a mix of different shapes and/or sizes. Predicting the wafer pattern in a tile requires inclusion of the data surrounding the tile. The surrounding data is called a halo. The halo must be large enough to capture significant effects on the predicted wafer pattern of the tile.

All conventional computer-aided design (CAD) algorithms for design or manufacture of devices use tile-based computing. Further, when iterative optimization algorithms are deployed, which occurs typically in NP-complete (non-deterministic polynomial time) problems, tile-based computing has each of the tiles separately iterate the optimization loop. Conventional tile-based systems suffer from the halo data becoming stale due to changes made by the optimization processes in adjacent tiles. The greater the number of optimization iterations in a tile, the more out of date its neighboring tile halos become. When resolving the data at the boundaries of the tiles becomes untenable, stitching problems arise. Tiles are usually computed where the output changes only the inside of the tile, but the computing occurs with visibility into the effects cast onto the tile by its neighbors as seen in the halos.

Details of Present Embodiments

Embodiments of this disclosure produce a Continuous Tone Mask (CTM) and a corresponding Quantized Tone Mask (QTM) for tiles of the entire design, such that the tiles can be combined to form an entire mask layer with concurrently updated halos (i.e., without stale halos), thus avoiding stitching problems that might adversely affect production. The CTM captures the values of a continuously varying amplitude transmission coefficient map, from which transmitted intensity can be calculated. In embodiments, a CTM is converted into a QTM, which is a 2-tone mask that allows short, smooth transitions between values and effectively locates edges between grid points. Regularization is a procedure and formulation that can bring a CTM to a QTM with the methods described in U.S. Pat. No. 7,716,627, "Solution-Dependent Regularization Method for Quantizing Continuous-Tone Lithography Masks." Like the CTM, the QTM is represented as a smooth function captured as a function sample array (FSA). The final QTM has regularized values and feature sizes. In a post process, contours are extracted to obtain mask geometry from the final QTM.

Figure 10A:
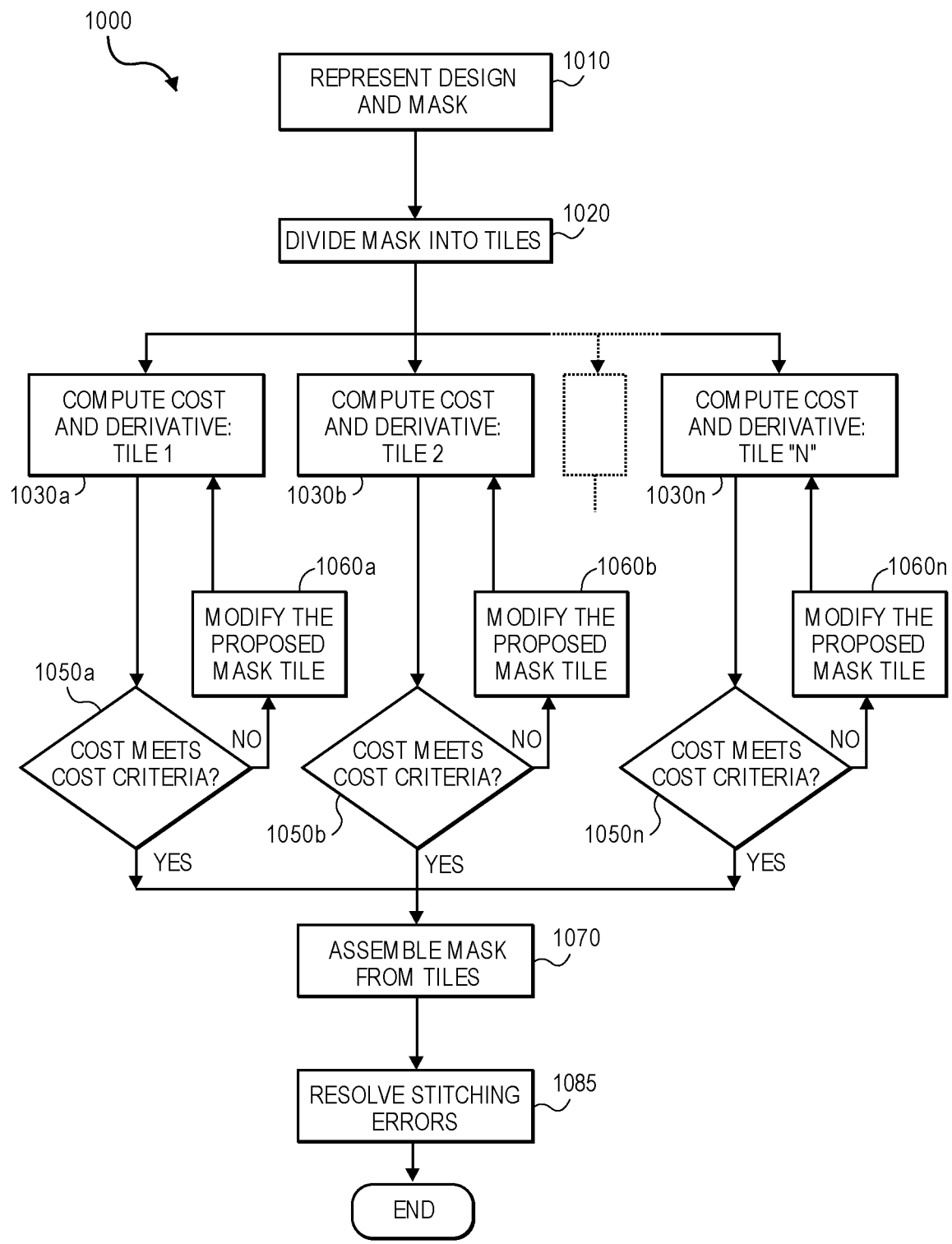
FIG. 10A is an example of a distributed computation for RET as known in the art, in which the design is broken up into tiles and then individual tiles go through an optimization loop, then the full design is assembled back together out of the tiles, with stitching errors to be resolved.

For masks for 193i projection of semiconductor wafers, the systems and methods known in the art on conventional computing platforms do not allow producing a CTM for larger than 400-1000 square micrometer areas in wafer dimensions at once. As shown in FIG. 10A, CTMs for tiles are produced, each tile with its halo region independently going through an optimization loop, then "stitched" together to form the entire mask layer, requiring additional processing to handle stitching artifacts. In contrast, embodiments of the present disclosure enable an entire mask layer, such as with an area of 7.5 square-centimeters in wafer dimensions, to be produced from the results of a series of calculated optimization loops, without the need for additional processing to handle stitching artifacts. The present disclosure presents methods to accomplish stitchless tiling of an entire design by iteratively optimizing a proposed lithographic mask or iterative processing for a two-dimensional tiled area. Embodiments of methods shown in FIG. 10B use a distributed computing system to hold the entire design in memory, performing calculations on computational regions or tiles in a distributive process and avoiding stitching errors by updating relevant halo regions across the entire design as needed with each iteration. Other embodiments, shown in FIG. 10C, perform calculations on much larger tiles that are held in memory independently of each other on separate computing nodes. This avoids stitching problems in a correct-by-construction fashion by iteratively optimizing a large tile, taking into account its halo to form an extended tile that is calculated on a single computing node. For example, using the approach in FIG. 10C, a tile may be divided into 10 by 10 partitions, or 100 partitions (each partition being the same size as a tile shown in FIG. 10B) and may have a halo area two partition widths (or 1.5 to 4 partition widths in other examples) surrounding it on all sides. A halo width of this size for this example ensures that the calculations up to the edge of the tile are correct. In some embodiments all independently optimized tiles are calculated in such a way that when combined the entire mask avoids stitching problems.

In some embodiments, techniques are applied to identify partitions within a tile which do not need refinement in subsequent iterations until otherwise determined. Under these circumstances, while the tile is being iterated, many of the partitions remain unchanged. These techniques can markedly improve computing performance.

In some embodiments, the relevant halos are refreshed on every iteration of the tile optimization. Not all halos need to be refreshed during every iteration. However, because tiles of the entire design are optimized independently using the method shown in FIG. 10C, embodiments beneficially take into account the tile's halo area during each iteration, in order to reduce stitching errors. In the example above, in the 14-by-14 extended tile comprising 196 total partitions includes the effective halo is two full partitions in width. With a halo area of this width, it is possible to perform many iterations before the effective halo becomes stale at the edge of the tile, i.e., the core computational region of 100 inner partitions. Using an algorithm that needs one base halo depth to perform one step with the halo just becoming stale at the edge of the core computational region after that step, N iterations can be performed if there are N times the base halo depth of neighboring data. In some embodiments, because the tiles are sufficiently large (for example, a single tile shown in FIG. 10C might comprise over 100 partitions that are the size of tiles in the method shown in FIG. 10B, where each partition is larger than tiles used in conventional methods and systems by one to two orders of magnitude in area) and because whole optimized tiles can be combined into an entire mask layer without the need for additional processing to handle stitching artifacts, the inefficiency that may be associated with calculating such a large tile is overcome. Increasing the tile size reduces the percentage of processed areas that are from halo regions. Calculating a single computational region or tile on a single computing node reduces both the amount of overhead in memory required to process the tile and the amount of processing that the halo regions add to the tiles, compared to conventional methods.

Some embodiments additionally utilize a more efficient data representation for the CTM, the QTM and the target wafer pattern, as compared to conventional methods. In these embodiments, the grid points for the arrays of values representing the proposed mask as an FSA and the target wafer pattern as an FSA are 4 or 5 times more sparse than existing measures and the data stored at each data point is minimal, yet the representations are accurate within the precision of the optical system being modeled. Added together, in some embodiments, the proposed mask (represented as either a CTM or a QTM) and the target wafer pattern for the entire mask layer for optical (193i) projection of wafer lithography can be stored in the combined memory of all the compute nodes of a commercially viable HPC cluster. In the future as EUV lithography requires ILT, a similarly commercially viable computing cluster of that time can store the entire mask layer for EUV projection. ILT of EUV requires higher precision and therefore requires more memory to represent the data. In this disclosure, for ease of comprehension, the discussion uses the 193i mask situation where the entire mask layer is stored in the aggregate memory of the computing cluster and is iteratively optimized together. The present disclosure is also applicable for processing large sections of the entire mask layer independently on separate nodes. In some embodiments related to the method shown in FIG. 10C, the proposed mask tile and the target wafer pattern for that tile can be resident in memory in a single node at all times throughout processing the section of the entire mask layer. This avoids time-consuming nonresident memory access, whether solid-state drives or hard-disk drives, enabling fast computations for optimization and updates of the halo regions of the tile with each iteration. The memory required to hold a large section is calculated as (X dimension/grid spacing)*(Y dimension/grid spacing)*(data size at each grid point). In some embodiments, intermediate results are only held in memory for the duration of the calculations within a tile.

Having either the CTM or the QTM and the target wafer function sample array for the tile in memory on a single node at the same time also enables the present embodiments to compute an optimization iteration for the tile, independently of other tiles that might be computed on other nodes. With tiles having sufficiently large halo regions, the present embodiments eliminate stitching issues in a correct-by-construction manner, and efficiently compute the CTM and related QTM for large sections using a commercially viable computing cluster. The present embodiments that allow for independently calculating tiles on a single node in a correct-by-construction manner make it possible to accurately design a mask that is larger than could be held in memory on a single HPC cluster in one location.

In some embodiments, some mask process correction, or enhancement of resilience to mask manufacturing variation, is performed during RET, where the mask is to be used in a lithographic process to form a pattern on a wafer.

In some embodiments, sampled values of smooth functions, which are continuous differentiable functions, on a grid are captured in an array. In some embodiments, how well the predicted wafer pattern matches the target wafer pattern is represented as a smooth function. This technique obviates the need to find contour edges on the predicted wafer pattern and then compare them to contour edges on the target wafer pattern which is done in most existing ILT implementations.

In some embodiments, the process may take the ILT process down to the point where the number of areas that are left to need further optimization are few enough, and the tile containing such areas are sufficiently large to be statistically likely that optimizing those areas are not going to affect the neighbor's halo regions inside the tile. By understanding where such areas are throughout the design, further optimization calculations can be avoided, saving compute time.

In some embodiments, there may be iteration among different optimization strategies, for example, where the tile or a series of partitions in the tile are optimized all together in one strategy on a single node, and where tiles are optimized independently of each other in another strategy. The strategy may be pre-set, such as optimizing the entire tile or a series of partitions in the tile for a pre-set number of optimization iterations (i.e., pre-determined maximum number of iterations), then optimizing the tile until the tile meets the "cost criteria" (which may be hitting a maximum number of iterations allowed or meeting some quality criteria). If the tile fails to meet quality criteria sufficiently, then the tile may be iterated again for another pre-set number of iterations. In another example, the strategy may be adaptive to some set of criteria observing the state of the mask design and the global and local optimization progress within the tile being computed including the rate of change, and the rate of change of the rate of change, of the optimization criteria (i.e., at least one pre-determined criterion) with various strategies being deployed with different parameters and potentially also different tiling of the entire design as the ILT process proceeds.

Function Sample Arrays

The goal of RET is to create a mask such that the energy in the substrate is below a threshold everywhere that the substrate should be clear (or dark in negative resist), above the threshold everywhere the substrate should be dark (or clear in negative resist), and transition through threshold at the desired locations. In some embodiments, smooth functions are used to represent clear areas, dark areas, and transition locations. Smooth functions are continuous and differentiable. The smooth functions are captured on a grid sufficiently fine to define the functions within a tolerance. The array of values representing a smooth function shall be referred to in this disclosure as a Function Sample Array (FSA), which is an array of real, or possibly complex, values of the underlying function at sampling locations. In some embodiments, smooth functions are implemented as band-limited functions, which are by nature infinitely differentiable. A band-limited function is a function that only contains frequency components within a fixed limit as opposed to a theoretically infinite number of components. The nature of the band-limited functions determines the sampling rate (grid spacing). The present embodiments uniquely recognize that light emanating from the mask and energy absorbed by the substrate are naturally represented by smooth functions. The target wafer pattern, the predicted wafer pattern, the CTM, and the QTM are modeled as FSAs.

Leveraging knowledge of the optical lithography allows smooth functions to be chosen such that the exact function can be defined on a grid much coarser than used in existing RET methods. The lithographic imaging resolution is based on a wavelength and a numerical aperture of the lithographic imaging system. In the present embodiments, an FSA grid has a plurality of grid points, and the grid points are spaced at a grid pitch. The grid pitch may be set by choosing a transition distance that is less than the lithographic imaging resolution of the lithographic imaging system and dividing the transition distance by a value such as from 3 to 6, or it may be set based on pre-defined edge placement error specification. The determining factor on the divisor is the accuracy required when determining where the function crosses the threshold. The key to these embodiments is that the smooth function is accurately captured by its values at the grid points. This means that the predicted wafer pattern grid points can be compared directly to the target wafer pattern grid points without having to compute the exact location of the wafer pattern contours. The ability to accurately represent a pattern with a limited number of samples enables the computation of large tiles with less memory and higher speeds than conventional methods. This enables fast, exact, and distributed computation—which can, for example, be GPU-based—of differentiable cost functions that measure the degree of shape matching.

Figure 2A:
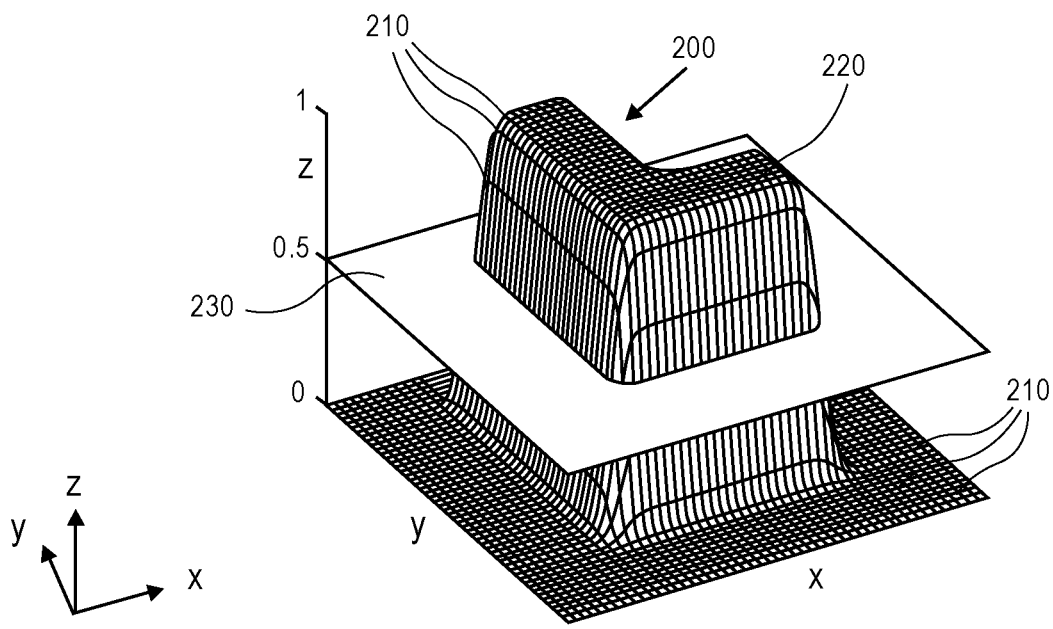
FIGS. 2A-2D illustrate an example of representing a pattern by a smooth function, according to embodiments of the present disclosure.
Figure 2B:
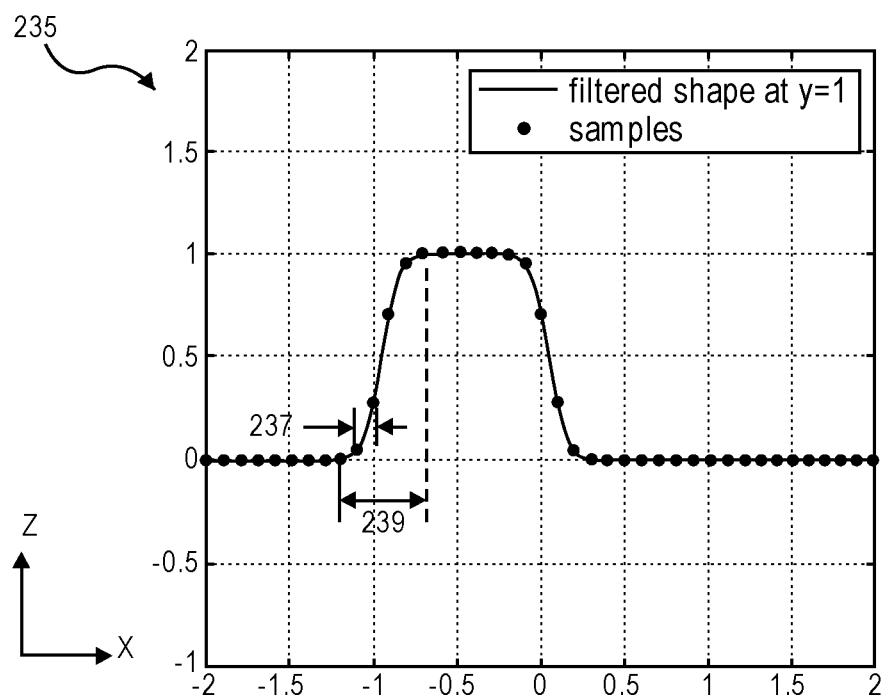

FIG. 2A depicts a smooth function of (x,y) being represented on a grid. The edges of the pattern for such a function $f(x, y)$ occur where it passes through a threshold value shown as plane 230. This plane 230 can be visualized as a level contour z=constant of the surface defined by $z=f(x, y)$. FIG. 2A shows a typical smooth function 200 and the function's intersection with the plane 230. Grid point locations 220 are where grid lines 210 intersect each other. In this example where 0.5 is the shape contour level for plane 230, the smooth function 200 has values≥0.5 inside the target shape, and values of <0.5 outside the target shape. This three-dimensional plot shows the smooth function as the height in the z-direction, with the height representing the sampled values at the grid points 220. The collection of values at the grid points for the smooth function 200 can be captured in a function sample array (FSA). The 2-D graph 235 of FIG. 2B shows a y-plane slice along a grid line which cuts across the L-shaped pattern. The grid spacing 237 is chosen such that there are multiple grid points on the function's transition 239 from z=0 to z=1. Multiple grid points ensure that the location of the function transition through threshold is within tolerance.

The smooth function demonstrated in FIGS. 2A and 2B can be used to represent a target pattern and a predicted pattern. In some embodiments, the cost and the cost derivative can be computed analytically due to the smooth characteristic of the target pattern function and the predicted pattern function.

The present embodiments form grids based on the lithographic imaging system physics for all stages from the CTM and QTM to the target wafer pattern FSAs, and have the ability to resample reliably onto finer grids. Because of this, the present embodiments can work on large areas in a single node. Further, the present embodiments decompose computations of extremely large areas such as an entire mask layer for 193i masks into tiles without stitching artifacts. These possibilities have not been obvious to the reticle enhancement technology industry since there are multiple stumbling blocks to address, such as accurate grid-based pattern representation without ultrafine grids, and reliably interpolating to finer grids on the fly. For example, instead of using a 1-4 nm sampling grid for an RET of 193i lithography as is typical in the prior art, in the present embodiments a sampling grid in the 10 nm scale can be used. This enlargement of the grid sampling saves 5× to 100× or more in required memory.

Figure 2D:
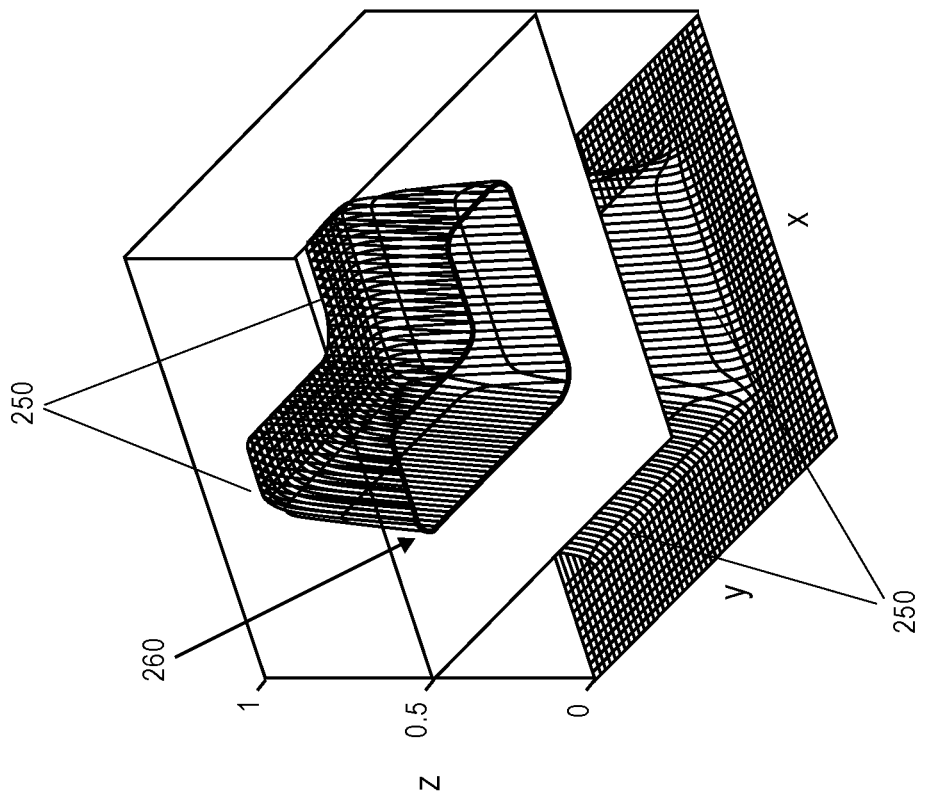
Figure 2C:
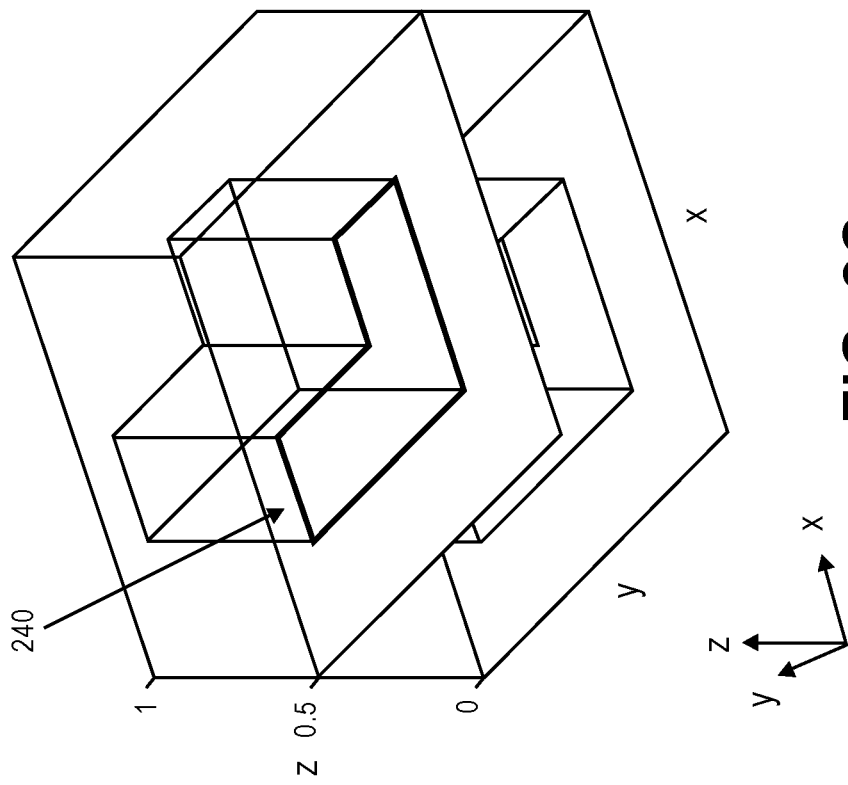

The FSA for the target wafer pattern is generated from the input target geometries. FIG. 2C shows a sample target geometry 240 in three dimensions as it would appear if everything inside the shape had a value of 1 and everything outside the shape had a value of 0. As that representation is unrealizable, the present embodiments apply a low-pass filter such as a Gaussian blur to the geometry to generate the smooth function 250 of FIG. 2D. The pattern 260 resulting from the smooth function 250 of FIG. 2D is still accurately captured as is seen by comparing it to the target geometry 240 of FIG. 2C.

The FSA for the predicted wafer pattern is generated from the CTM using a lithography system model. The predicted wafer pattern FSA is massaged to have characteristics similar to the target wafer pattern FSA, such as values near 1 inside a shape, near 0 outside a shape, and with smooth transitions between these regions. This massaging prevents a value of 0.15 in the predicted pattern being a mismatch for a value of 0.0 in the target pattern in clear (or dark in negative resist) areas. The only values that are critical are where the function transitions through the threshold. Therefore, when the values at the grid points of the predicted wafer pattern FSA match the values of the target wafer pattern FSA, the mask will accurately create the desired pattern on the substrate. The smooth function representations that are in an FSA support optimizing values without any explicit knowledge of edge locations in the target or predicted wafer patterns.

Use of Fast Fourier Transforms

The present embodiments are independent of U.S. Pat. No. 7,856,612 which is based on an insight that physics of lithographic imaging systems are highly adaptable to a 2-dimensional Fourier (plane-wave) basis to represent all quantities, thus inviting the use of Fast Fourier Transform (FFT) methods to do efficient computations. There is great value in harnessing the machinery of linear vector spaces, and the present methods utilize this advantage by representing the CTM as a linear combination of a complete set of orthonormal basis functions. The physics of lithographic imaging are particularly suitable for a 2-D Fourier basis, since only components with spatial frequencies $f \leq f_{cut}$, where $f_{cut}$ is the system resolution cutoff, will contribute to the projected images. The cutoff depends on the details of the illumination and the projection optics, but generally $f_{cut} \leq 2NA/\lambda$ for partially coherent imaging with quasi-monochromatic light with wavelength $\lambda$, and an imaging system with numerical aperture NA.

Two major benefits of using a Fourier basis set are that the convolutions required to compute images are now simple multiplications in Fourier space, and efficient FFT implementations are commonly available. The most compute-intensive optimization work can be performed with just the low frequency mask components within the lithographic imaging cutoff. Taking inspiration from the lithographic imaging cutoff further, some embodiments of the present Fourier-based methods find the optimal mask function captured in the CTM that is band-limited to $f_{cut}$. Once this is found, the CTM can be transformed into a QTM to produce a manufacturable, physical mask in a separate process.

In some embodiments, efficiency is gained because excessive oversampling is avoided for the grid used to represent the band-limited mask function, and then the grid is interpolated to finer grids as needed for computing patterns and cost densities. Background review of discrete sampling of a band-limited function and its reconstruction from these samples shall first be presented.

Figure 3:
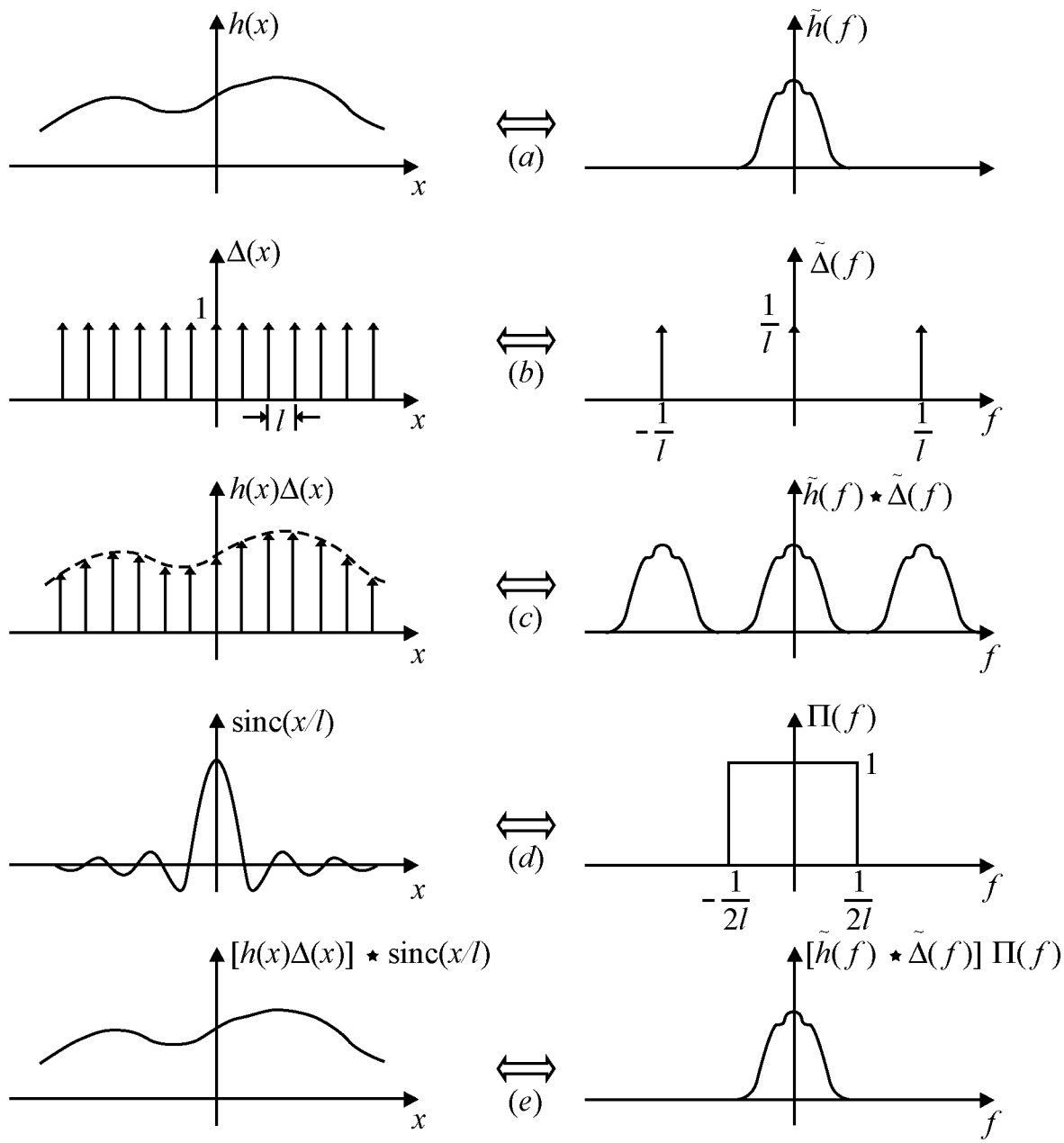
FIG. 3 illustrates sampling of a band-limited function and reconstruction of the function from the samples, as known in the art.

Consider a band-limited function h(x) and its Fourier transform ĥ(f), as illustrated in FIG. 3(a). The double-ended arrows in the figure indicate that the left and right plots are Fourier transform pairs. The function h(x) is sampled by multiplying it with the sampling function Δ(x), which is a train of Dirac delta functions spaced "l" apart, as illustrated in FIG. 3(b). The sampled function and its transform are illustrated in FIG. 3(c). There is no aliasing in this example since the convolution images do not overlap, which is the condition that establishes the Nyquist criterion. Reconstruction of h(x) from its samples is now shown. Referring to FIG. 3(d), the spectrum is multiplied by the ideal low pass filter Π(f) to eliminate all but the baseband spectrum by filtering out the higher order convolution images. This corresponds to convolving the sampled function with sin c(x/l). The result illustrated in FIG. 3(e) matches the initial function of FIG. 3(a).

FFTs work directly with the sample values but cast the data as periodic outside the interval of data analyzed. There is one class of functions for which the FFT and the continuous Fourier transform are the same (within a possible scaling constant), and therefore for which the reconstruction of intermediate values will be exact. In that class of functions, the function h(x) must be periodic, h(x) must be band-limited, the sampling rate must be at least twice the largest frequency component of h(x), and the data interval must be an integer number of periods of h(x). The last requirement amounts to there being no mismatch due to the imposition of periodic boundary conditions (PBCs).

Figure 4:
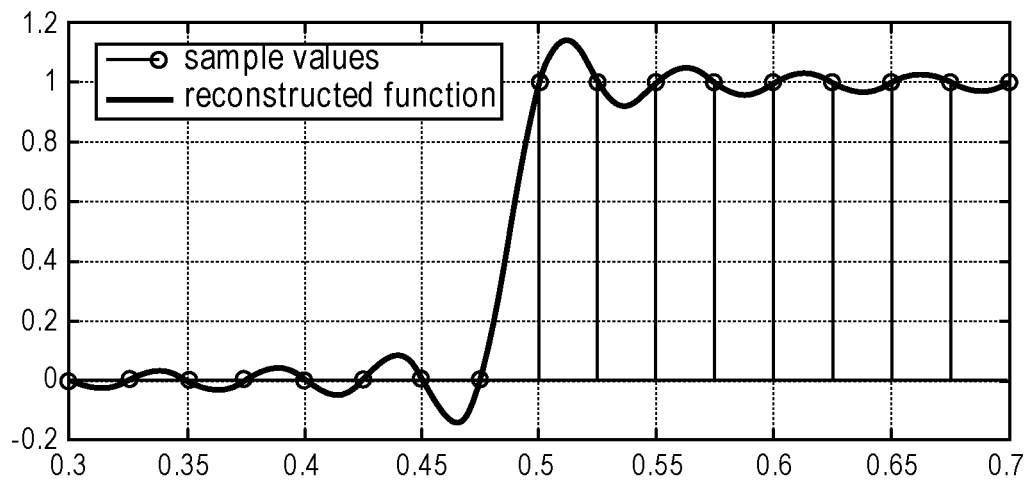
FIG. 4 is an example of boundary mismatch ripples as Gibbs phenomenon, as known in the art.

Value mismatches from imposed PBCs are a jump in value from one side of the boundary to the other. There is ringing in the reconstructed function near these boundaries that is equivalent to the Gibbs phenomenon for step discontinuities. Any mismatch from the PBCs will behave exactly like a step discontinuity at the midpoint between sample points. FIG. 4 provides an illustration, showing the samples and the results of Fourier interpolation near the sudden jump in sample values for a square pulse. The smooth curve is the band-limited periodic (over the full interval) function that is consistent with the samples, and it shows the ringing characteristic of the Gibbs phenomenon.

Figure 5:
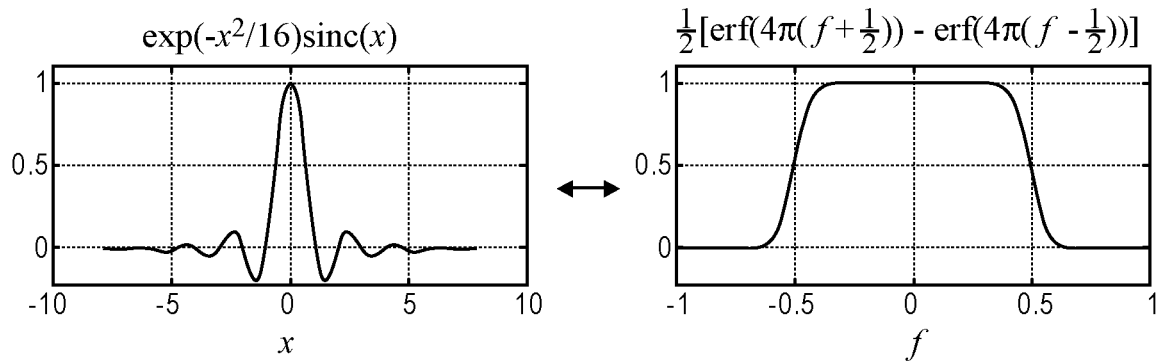
FIG. 5 illustrates application of a Gaussian envelope factor to reduce periodic boundary condition mismatch effects, according to embodiments of the present disclosure.

To reduce the ringing, some embodiments localize the Fourier interpolation kernel with an envelope factor. A Gaussian envelope factor shall be described herein, but others may be used. Furthermore, other interpolation methods such as splines, polynomials, rational functions, and so on, may be used instead of Fourier interpolation. The Fourier interpolation kernel can be localized by applying a Gaussian envelope factor $exp(-x^2/s^2)$ to the usual sin $c(x)$ kernel, which limits its range smoothly and strongly. Essentially, this is a modification of FIG. 3(d) to the Fourier transform pair illustrated in FIG. 5, where the width parameter has been set to s=4 in this embodiment. This width provides a tradeoff between interpolation accuracy and added halo thickness (i.e., a boundary layer added to a tile, as shall be described in a later section) needed to give fully-converged results. In frequency space, the width adjusts the width of the error function roll-offs of the low pass filter. For accurate reconstruction of the highest frequency components, the function may be band-limited to the flat top of the filter. Using this approach, the approximation is uniform in that the same range of samples is used to interpolate everywhere, and values at the original sample points are preserved.

Figure 6:
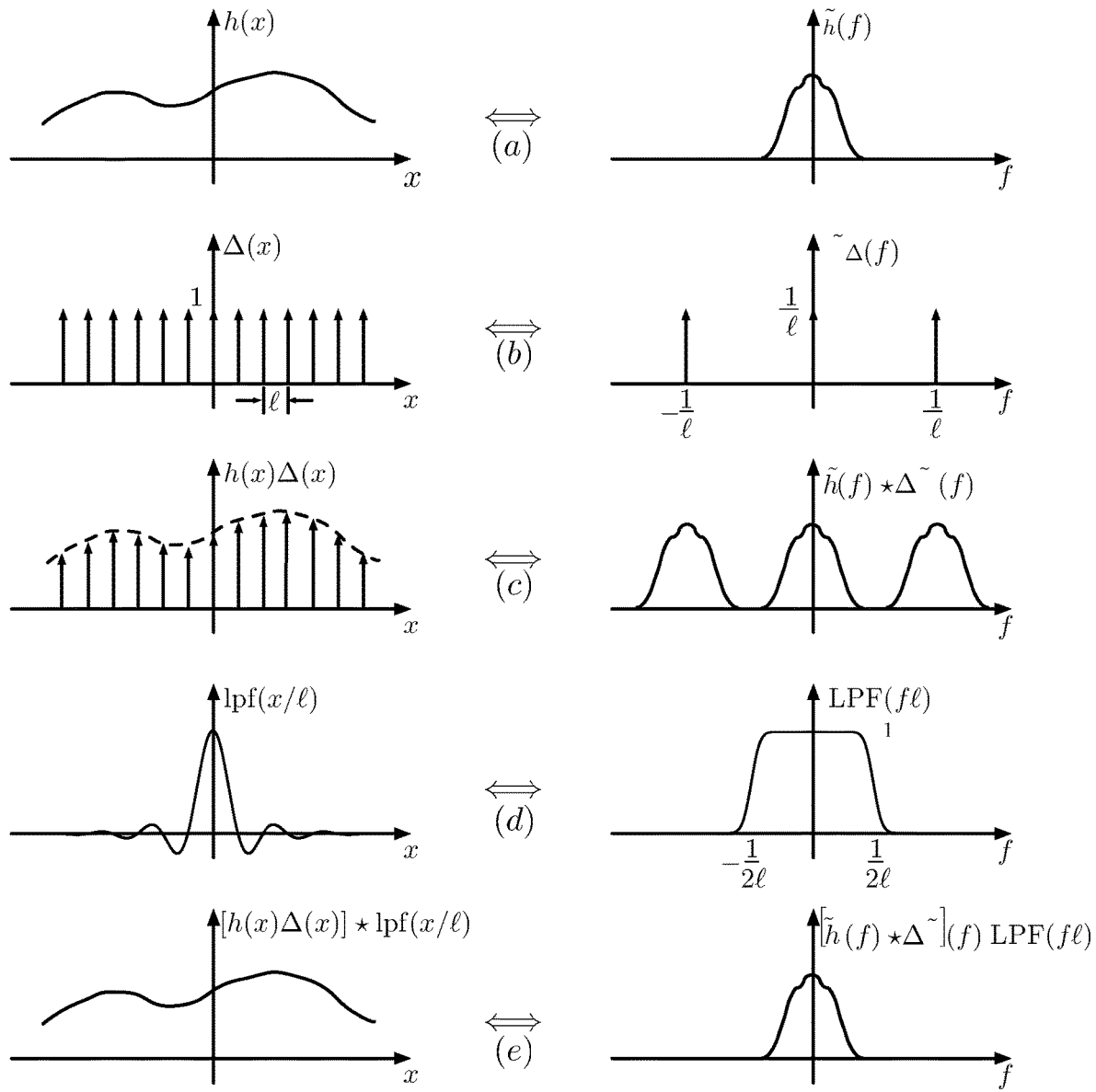
FIG. 6 illustrates reconstruction of a sampled band-limited function using a filter with a Gaussian envelope factor. The embodiments of the present disclosure capture smooth functions at sample points.

FIG. 6 illustrates graphically what operations are performed in the present methods to reconstruct the function using Gaussian-localized interpolation. FIG. 6 is similar to FIG. 3, except for step (d). Accordingly, the descriptions of FIGS. 3(a), (b), (c) and (e) apply to FIGS. 6(a), (b), (c) and (e). In step (d), the low pass filter is $lpf(x/l)=exp(-x^2/s^2)$ sin $c(x)$ in real space, and $LPF(fl)=-\frac{1}{2}[erf(\pi s(f+\frac{1}{2}))-erf(\pi s(f-\frac{1}{2}))]$ in frequency space. That is, the present methods involve a Gaussian-localized interpolation Fourier transform pair.

Figure 7:
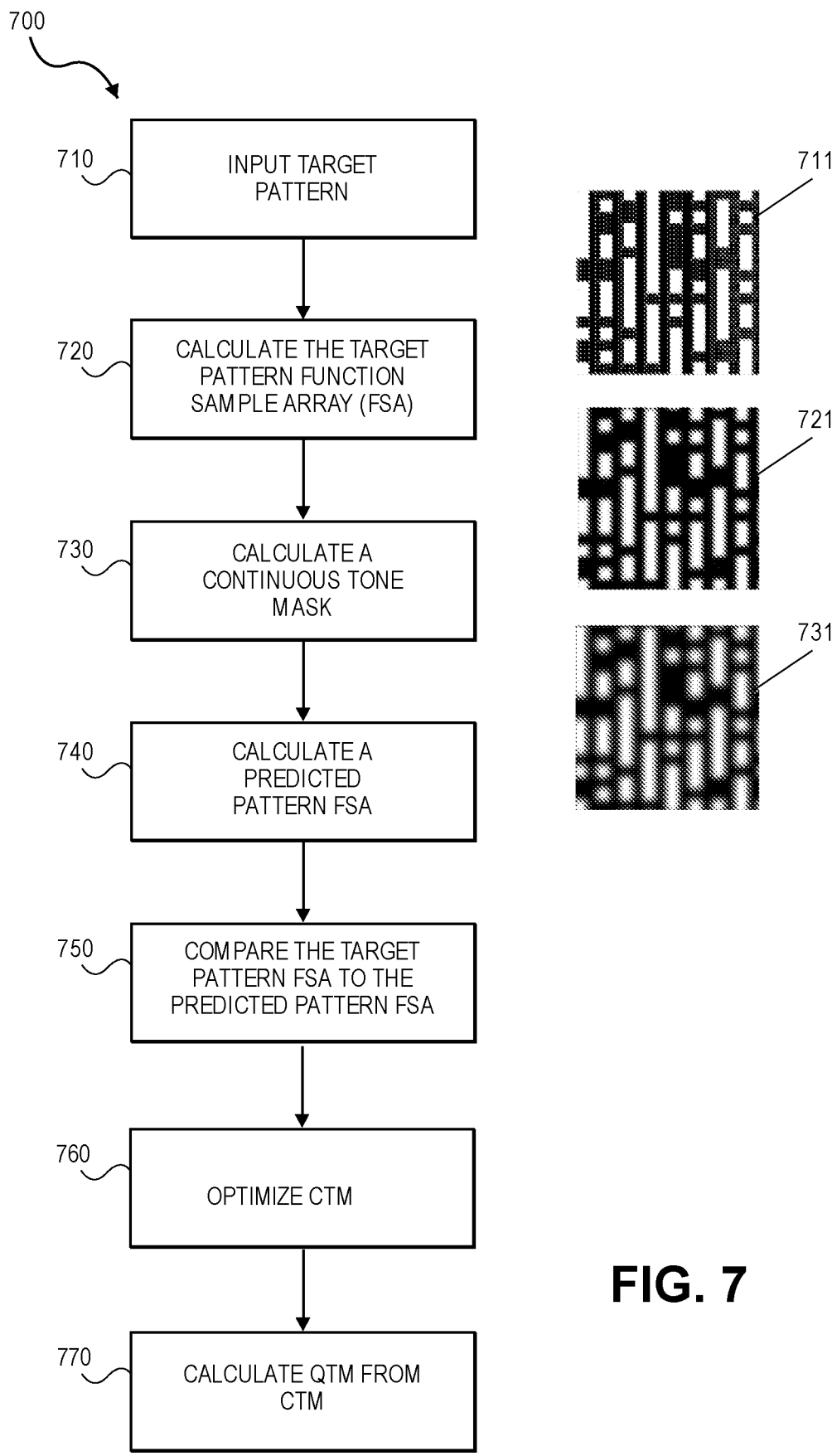
FIG. 7 is an embodiment of methods related to calculating a Continuous Tone Mask (CTM) and predicted pattern according to the present disclosure, then converting the CTM to a Quantized Tone Mask (QTM).

FIG. 7 is an example flowchart 700 of a method for reticle enhancement technology in which smooth functions are captured in FSAs and used for a target pattern and for a mask that is to be used to produce a predicted pattern that is compared to the target pattern (e.g., a target wafer pattern). For example, flowchart 700 describes methods for representing a target wafer pattern or a predicted wafer pattern as a smooth function captured as an FSA, where the FSA is an array of function values which can be real numbers, complex numbers, or an aggregate of numbers. In step 710, a target pattern to be used in reticle enhancement technology, such as pattern 711, is input. The target pattern 711 can include many patterns of a design (e.g., the individual rectangular and square patterns in target pattern 711) as shown in FIG. 7, such as an entire mask layer of a semiconductor chip, or can be a single pattern to be written onto a surface such as the individual L-pattern shown in FIG. 2C. Next in FIG. 7, a target pattern FSA for the target pattern is calculated in step 720. The generating of the target pattern FSA in step 720 can, in some embodiments, include applying a low-pass filter to the target pattern. The target pattern function is pictorially represented as function 721 in FIG. 7, where function 721 is slightly blurred compared to target pattern 711. The target pattern function 721 is band-limited to a bandwidth of the low-pass filter, and the target pattern is sampled on a pattern grid having a first sampling rate that may be at least twice the bandwidth of the low-pass filter. The low-pass filter bandwidth may be set to maintain edge locations and to allow rounding of corners consistent with the lithography system characteristics or a specification provided with the target pattern.

In step 730, a CTM 731 is calculated. The CTM 731 can be initialized with a first guess, such as a constant value, a low-pass filter applied to the target pattern, a previously determined CTM (e.g., a preliminary result previously computed), or a low-pass filtered mask obtained through other means (e.g., when addressing a hot spot in an existing mask design or examining a solution provided by another system).

In step 740, a predicted pattern FSA (representing a predicted wafer pattern) is calculated from the CTM and the system models.

In step 750, the target pattern FSA is compared to the predicted pattern FSA computed for the CTM. Comparison of the target pattern FSA and the predicted pattern FSA uses grid points of the pattern grid. The comparison may include calculating a cost density function using the target pattern function and the predicted pattern function. The predicted pattern function (FSA) may be generated using the CTM, a lithographic imaging system model, and a resist process model.

Step 760 for the present embodiments involves an optimization technique for the CTM of iterating on a proposed solution until the cost is reduced to as close to 0 as possible when the values at the equivalent grid points are compared for the predicted pattern FSA and the target pattern FSA.

In step 770, when the desired result is achieved, the proposed solution is captured as an optimized CTM, which is further regularized and transformed into a QTM.

Figure 8A:
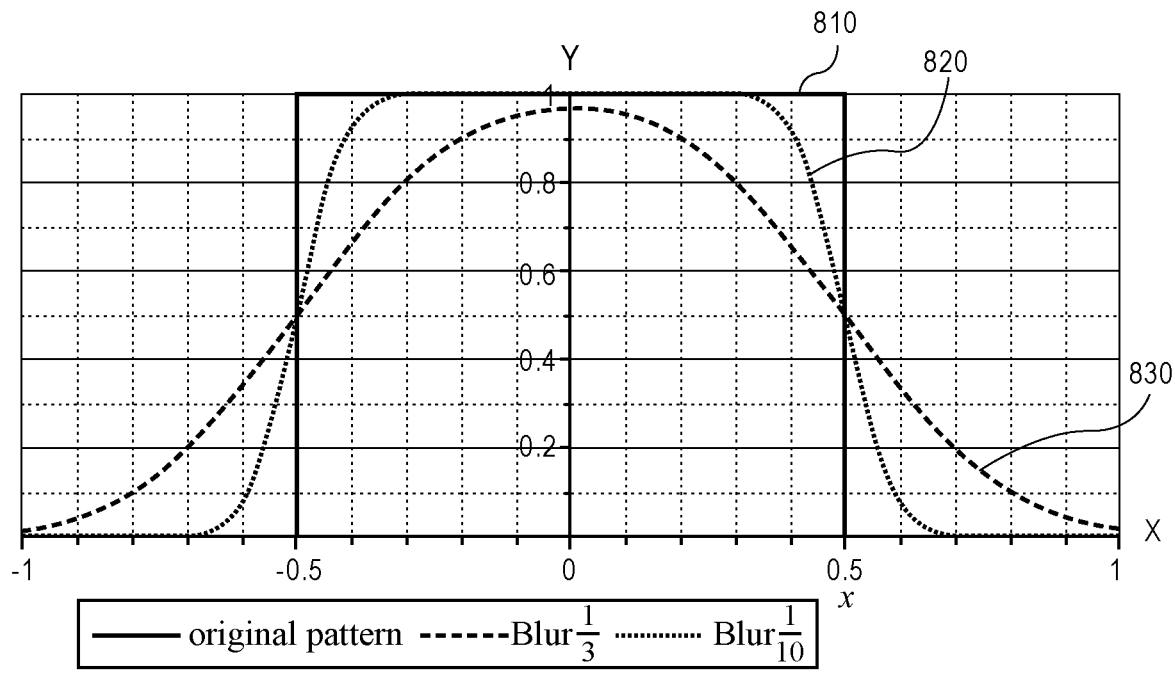
FIGS. 8A-8B illustrate applying filters to a target pattern, according to embodiments of the present disclosure.
Figure 8B:
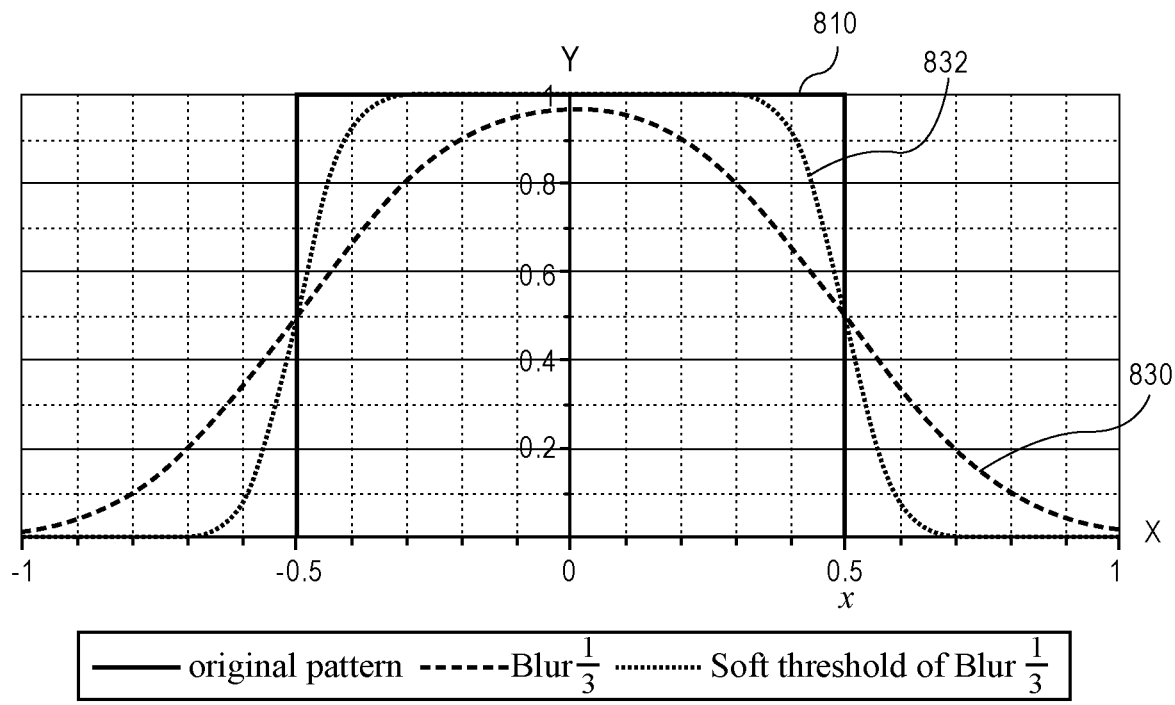

FIGS. 8A-8B provide details on generating a smooth function for the FSAs of the present embodiments, such as for a target wafer pattern. For simplicity, the graphs are illustrated in 1-D where the x-axis represents a spatial location and the y-axis represents the value of the smooth function. The smooth function is generated by convolving with a low-pass filter, which may also be described as applying a blur. FIG. 8A has three curves that illustrate a smoothed target pattern representation. Curve 810 is the ideal target pattern, which in this example has edges at the spatial locations x=+0.5 and -0.5. Curve 820 is the result after applying a Gaussian blur of (1/e) width w=1/10 to curve 810, and the curve 830 is the result after blurring curve 810 with a broader Gaussian of (1/e) width=1/3. Notice that all of the curves 810, 820 and 830 intersect at the ideal edge locations at a y-value of 0.5, which is a consequence of arbitrarily choosing, for this example embodiment, a value of 1 for y-values indicated inside the shape, and 0 for y-values outside the shape. Barring any other considerations, the geometric target shape can therefore be represented as the contour of the smoothed curves for a y-value of 0.5. The Gaussian blurring means the curves are effectively limited in spatial frequency; in fact, the blur multiplies the frequency spectrum by a Gaussian of 1/e width (1/πw) in frequency units. A criterion of 20 dB attenuation to define the Gaussian filter bandwidth corresponds to using 3 to 4 sample points through the smooth edge transition from approximately 0 to approximately 1 to capture the smoothed curves 820 and 830 nearly perfectly.

The plot of FIG. 8B shows how the pattern can be held in the smoothest representation (blur width 1/3) but then sharpened up to something very similar to the blur width 1/10 (curve 820) by running the blur curve's y-values through a soft thresholding function. The result is the curve 832, which looks almost exactly like the result for the narrower blur for curve 820 of FIG. 8A, and which is flat at full values away from the edges. This is good for doing comparisons without the explicit contour-chasing that conventional methods use. Using this blurring technique, the present methods can take the difference between two curves that are similar in flavor to the blur 1/10 curve (curve 820) or the sharpened blur 1/3 curve (curve 832) to check on the degree of mismatch between two patterns.

Optimizing the CTM

The present embodiments utilize an optimization technique of iterating on a proposed solution until the desired result is achieved. The proposed solution is captured as the CTM, which is later transformed into a QTM in some embodiments. The measurement of the desirability is determined by comparing the FSAs for the predicted wafer pattern and the target design pattern. The comparison of the FSAs involves comparing, perhaps within some tolerance, the values at the equivalent grid points representing the two functions. The goal of the process being described is to reduce the cost as close to 0 as possible. Other techniques are possible to converge using different cost metrics.

Figure 9A:
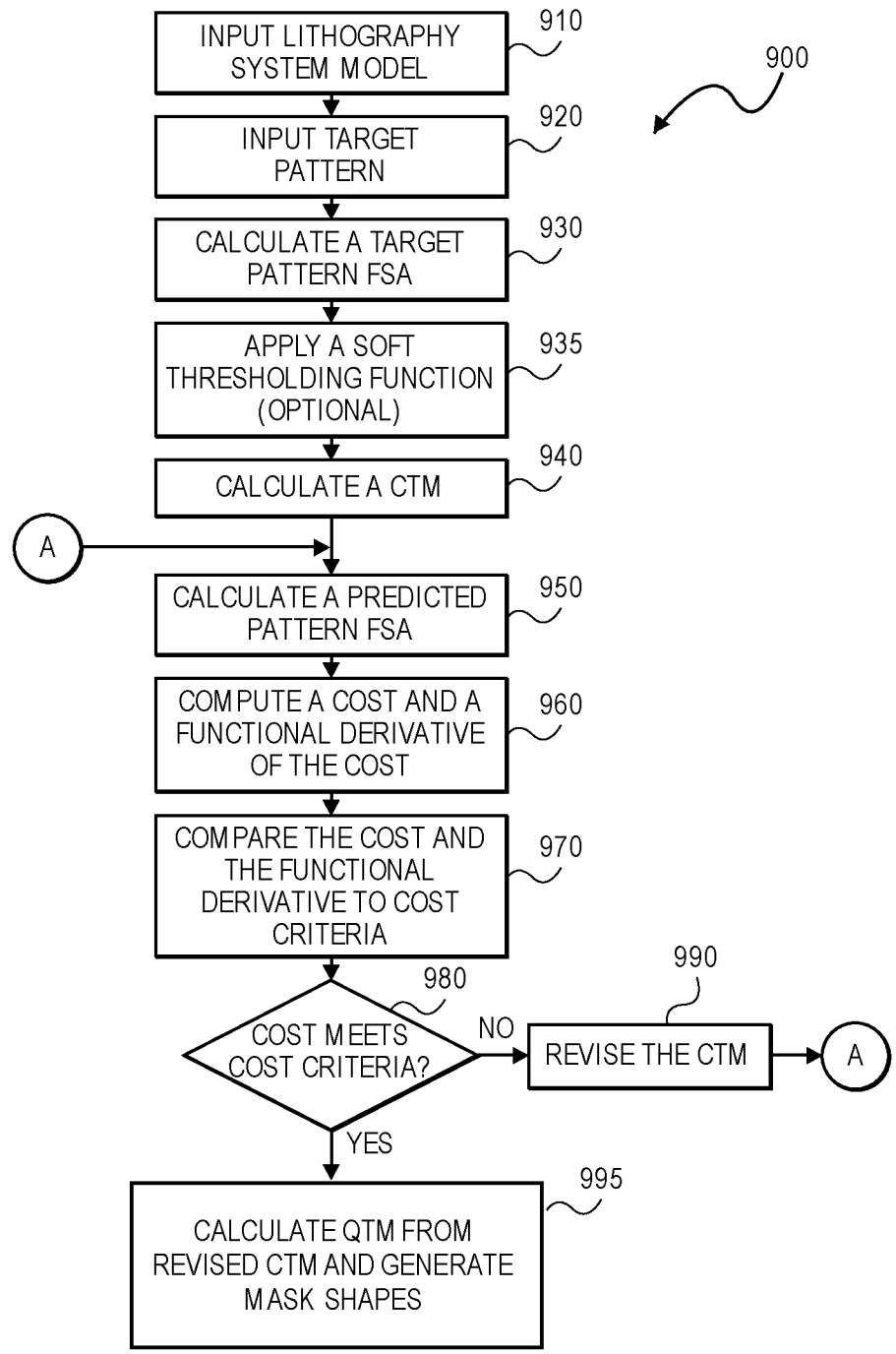
FIG. 9A is another embodiment of methods according to the present disclosure.

FIG. 9A is an example flowchart 900 of a method for reticle enhancement technology in which FSAs are used for all steps involved with generating optimized mask shapes from the CTM in the form of a QTM that will produce a target pattern on a wafer. In step 910, a substrate lithography system model, such as for wafer lithography, is input. The substrate lithography system model includes one or more of an optical, EUV or other lithographic system model, a resist process model, and any other models needed to predict the printed pattern on the substrate resulting from a mask. A model included in the substrate lithography system model may be a complex, physically accurate model, a simpler empirical model, or any other level of model according to a specification, including a null model that removes most or all its effects on a final result. The substrate imaging system model can include parameters such as wavelength, illumination pattern, numerical aperture, refractive index, and so on.

Step 920 includes inputting a target pattern (e.g., a target wafer pattern) to be formed on the substrate using the substrate lithography process, the target pattern being within a design area. In some embodiments, the target pattern comprises a plurality of patterns on a wafer, and the design area may comprise an entire mask layer or a large section of a mask layer of a semiconductor chip. In step 920, in some embodiments of the present disclosure, certain geometric manipulations of the target pattern may be performed. For example, edge bias that accounts for etching effects during the processing of the substrate may be precomputed prior to the optimization steps in steps 930 and later.

In step 930, a target pattern FSA is calculated for the target pattern, such as a target wafer pattern. In some embodiments, the calculating of the target pattern function includes applying a low-pass filter (which may also be referred to as a blurring) to the target pattern as described in relation to FIG. 8A. The low-pass filter may be, for example, a Gaussian, or any other filter that is well-localized in space and frequency.

In step 940, a CTM (i.e., a proposed mask) is calculated, as explained in relation to step 730 of FIG. 7.

In step 950, the substrate lithography system model is used to calculate a predicted pattern FSA that will be produced on the substrate by the CTM. In some embodiments, the calculation of the predicted pattern FSA (e.g., a predicted resist pattern function) can include calculating a projected image function from the CTM, using the substrate imaging system model. The projected image function and a resist process model are then used to calculate the predicted pattern FSA produced by the projected image function. The calculating of the projected image function may utilize a localized Fourier interpolation to go to a finer grid according to the needs of the calculation method or of subsequent use of the projected image.

In step 960, a cost is computed using the target pattern FSA and the predicted pattern FSA, and a functional derivative of the cost with respect to the CTM is also computed. The cost may be, for example, a total cost. The cost can be represented by a smooth function. In some embodiments, the costs may be global cost data, which can include, for example, local partial costs, cost densities, and cost gradients. In some embodiments, the computing of the functional derivative accounts for neighboring pattern information in a boundary area surrounding the design area. In some implementations, the computing of the cost includes calculating a cost density function using the target pattern function and the predicted resist pattern function, and integrating the cost density function over the design area. The calculating of the cost density function can include squared differences between the target pattern function and the predicted resist pattern function, absolute values of these differences, or any formula that produces positive values that tend to zero where the patterns match and to larger numbers where they do not. These cost density values may also be weighted according to other information provided with the target pattern or derived from the target pattern. For example, the weights may be used to emphasize fitting edges and deemphasize matching corners.

In step 970, the cost and the functional derivative are compared to cost criteria. In other words, this comparison determines a mismatch between the predicted and desired patterns. The cost criteria can include converging the cost to a value near a minimum, or minimizing the magnitude of the functional derivative, or its components. That is, the cost criteria can be deemed to be met when further iterations do not vary from previous solutions by more than a certain amount. The cost criteria in some embodiments can include evaluating a distribution of values of the cost density function over the design area. The cost criteria can also be defined as an amount of mismatch, for example, a specified acceptable amount, such as a geometrical value or a percentage.

Note that in flowchart 900, variations are possible. For example, steps 910 and 920 are interchangeable in sequence. Step 930 can be a null-step in some embodiments of the present disclosure. Steps 940 and 950 may be combined in one step. In steps 960 and 970, computing the derivative is optional. Other computations could be done in steps 960 and 970 to help iteration on the CTM.

In some approaches, a target pattern function with more distinct edges can be generated prior to the computing of the cost of step 960, by applying a soft thresholding function in step 935 to the target pattern function to sharpen the edges of the target pattern function. This thresholding is illustrated in FIG. 8B. The soft thresholding turns the encoded patterns into higher resolution functions that are featureless away from the edge transitions, thus giving more weight to the contours without the need to determine them directly. This allows the target pattern function to be stored at lower grid resolution than when used for making comparisons. The cost, such as a total cost, is computed in step 960 using the target pattern FSA after any applied sharpening and the predicted resist pattern function.

In an example of thresholding the target pattern FSA, the target pattern FSA in step 930 is generated by applying a low-pass filter to the target wafer pattern, such that the target pattern function is band-limited to a bandwidth of the low-pass filter. The target pattern function is sampled on a first pattern grid having a first sampling rate that may be at or higher than the Nyquist rate for this bandwidth, and the thresholded target pattern function that is generated in optional step 935 is sampled on a second pattern grid having a second sampling rate that is higher than the first sampling rate. The soft thresholding function may be, for example, a sigmoidal function that sharpens transitions between minimum and maximum values in the target pattern. For example, the slope of the thresholded target pattern function may be increased in transitions between minimum and maximum values in the target wafer pattern, thus sharpening the edges of the target pattern function.

Soft thresholding enables the function to more closely conform to results of the predicted resist pattern function. Soft thresholding can be implemented as mapping 0 to "0" (soft range), 1 to "1", a threshold value to a threshold value (e.g., ½ to "½"); and can be implemented as a smooth, monotonically increasing switching function based on the Gaussian error function, the hyperbolic tangent, or any other sigmoidal function one of ordinary skill may devise. In some embodiments, this first soft thresholding function can also be applied to the predicted resist pattern function to generate a second predicted resist pattern function for comparison to the target wafer pattern.

Returning to step 980 of FIG. 9A, if the cost criteria are not met, the method is iterated as indicated by step 990 by revising the CTM to reduce the cost, using the functional derivative of the cost to provide direction on how to revise the mask. This will use the derivative calculations and use any suitable algorithm such as conjugate gradient to pick a "direction" to move from the current mask parameters to lower the cost. The cost, or partial contributions to the cost, may be used explicitly in this process, or the gradient components, or both. In some embodiments, steps 960 and 995 include calculation of the mask shapes' printability and resilience to manufacturing variability to be used as a part of the optimization cost. Size, spacing, and slope of CTM at a certain threshold or multiple thresholds of CTM are examples of components in such a cost. Steps 950, 960, 970, 980 and 990 would then be repeated as indicated by loop "A" until the cost criteria are met. Revision of the CTM for each iteration could consider further factors in addition to the functional derivative, such as historical data on previously calculated solutions. The final CTM is then output in step 995. In step 995, the CTM data may then be "legalized" into a more reliably manufacturable mask pattern such as a QTM. This process may involve reducing hot spots, measuring CD variation against dose variation, correcting for linearity and enhancing critical dimension uniformity (CDU) and line-edge roughness (LER) among other measures of resilience to manufacturing variation. In some embodiments, step 995 includes a separate step to produce a more reliably manufacturable mask. An example of such a step is to force all shapes and spacings to "snap" to adhere to a prescribed minimum. By incorporating these factors as costs during the optimization loop in step 960, the amount of snapping will be negligible with negligible impact on the resulting quality in the predicted pattern FSA. These mask patterns may also further be processed to incorporate some MPC of mask manufacturing effects such as mask etch bias. In the present embodiments, step 995 may include all MPC and the creation of a QTM, a 2-tone mask that effectively locates edges of manufacturable mask features between grid points on the CTM. In some embodiments, this process can involve a total cost system to penalize masks that cannot be made, while optimizing to both reduce manufacturing penalty and retain good wafer results. In some embodiments, a cost function for mask value regularization can be used as a method to convert a CTM into a QTM. In some embodiments, a cost function for mask feature size regularization can include a preference for mask features that can be created with fidelity and control. The final QTM has regularized values and feature sizes, like rasterized shapes. The output of the legalization step may be in the form of data to drive one of a range of charged particle beam technologies, such as to generate exposure instructions directly from the CTM or from a QTM that has been translated from the CTM.

Figure 9B:
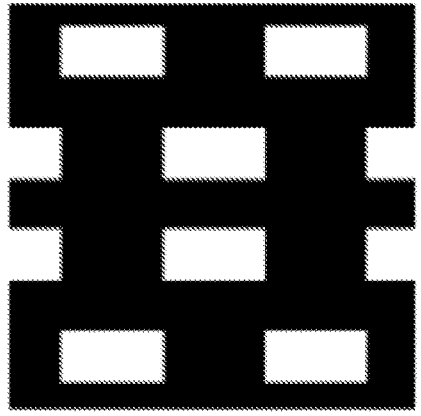
FIG. 9B provides example illustrations of the steps corresponding to the flowchart of FIG. 9A.
Figure 9B:
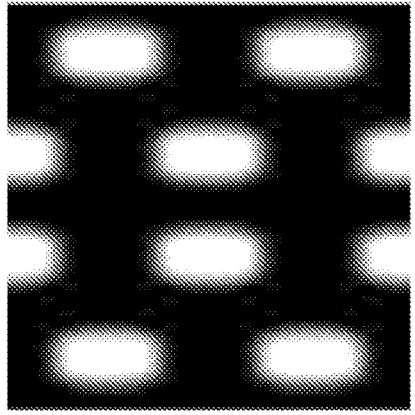
Figure 9B:
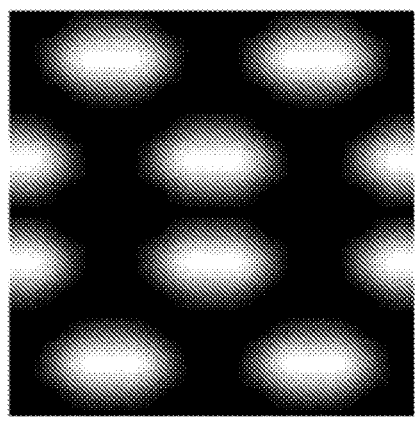
Figure 9B:
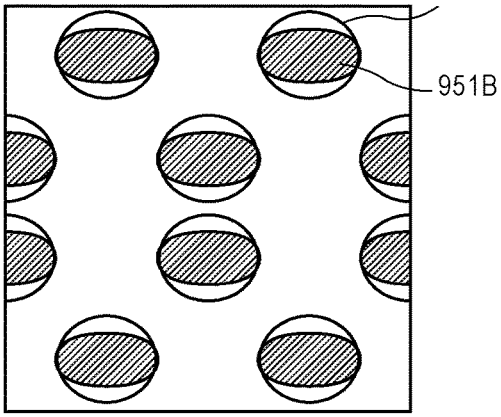
Figure 9B:
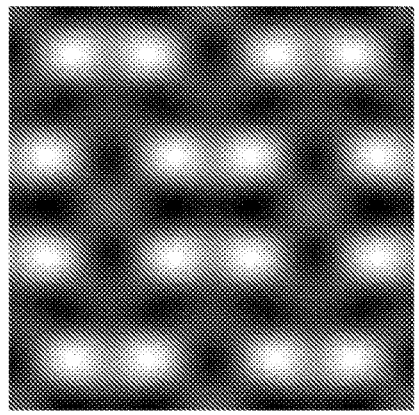
Figure 9B:
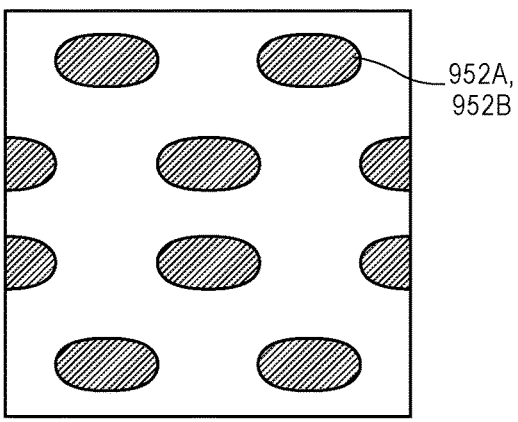

FIG. 9B provides example illustrations of the steps described in flowchart 900 of FIG. 9A. Target pattern geometry 921 is an example of a target pattern that is input in step 920, where target pattern geometry 921 in this embodiment includes several rectangular shapes. Target wafer pattern FSA 931 corresponds to the target pattern function that is generated in step 930. An initial CTM 941 is generated in step 940, and an initial predicted pattern FSA 951A is produced by the initial CTM 941 in step 950. Diagram 951 illustrates the initial predicted pattern FSA 951A as open curvilinear shapes, and the target wafer pattern FSA 951B as cross-hatched shapes. The difference, between the initial predicted pattern FSA 951A and the target wafer pattern FSA 951B, as illustrated in 951, is used to compute a cost and a functional derivative of the cost in step 960. If the cost criteria are not met in steps 970 and 980, a revised (improved) CTM 991 is calculated in step 990. Loop A is then iterated, in which a revised predicted pattern FSA 952A is calculated in step 950 using the improved CTM 991. Similar to diagram 951, diagram 952 illustrates a difference between the revised predicted pattern FSA 952A and the target wafer pattern FSA 952B. No open shape can be seen, indicating that the revised (and improved) predicted pattern FSA 952A is sufficiently close to the target wafer pattern FSA 952B that the difference is not visible in diagram 952. The difference between the improved predicted pattern FSA 952A and the target wafer pattern FSA 952B is used to determine if the cost criteria are met. Note that in FIG. 9B, the functions are depicted as conventional contours of geometric shapes, where the contours are illustrated at a resist exposure threshold level in this example. These contours illustrate how the pattern shapes are improved using the present methods. However, as explained throughout this disclosure, some embodiments of the present methods perform computations using FSAs rather than working with the geometric contours.

Distributed Processing

An aspect of the present embodiments is the combination of data representations as FSAs as captured on a regular grid, which efficiently delivers and receives data from each process of a distributed process.

As stated previously, in order to predict the mask pattern for the CTM and compare the predicted substrate pattern that the CTM produces to the target substrate pattern, the present embodiments decompose the design into tiles, or large sections of the mask layer, that may be further partitioned. Although the present embodiments of optimizing an entire design through distributed processing shall be described first in terms of a CTM and finally as a QTM, the embodiments can also be applied to types of proposed masks other than the CTMs and QTMs described herein. In some embodiments, the proposed mask for a single tile, first represented as a CTM and later represented as a QTM, and the corresponding target substrate pattern for that section of the design are held in memory on a single node.

Segments of the FSAs can be sampled at a higher rate when computations are being performed on specific partitions within a tile or on specific tiles within the entire design. For example, the entire pattern can be divided into a plurality of tiles, and calculations on the plurality of tiles are performed in distributed processes. Distributed processes operate independently, and many processes can run at the same time. In some embodiments, a single tile is processed on a compute node of a computing cluster. That cluster may hold other nodes operating on other tiles in parallel. In any tile of the plurality of tiles, the CTM, the predicted pattern FSA that it produces, and the target pattern FSA are delivered at the design-wide grid spacing, but when more detailed calculations are required, the values of the FSAs can be calculated at any spacing. The results of the distributed process are returned on the design-wide grid spacing. That is, the sampling rate can be increased for higher resolution calculations when computations are being performed on a particular region of the tile, but the additional values (higher sampling rate) of the FSA do not need to be stored in memory during the computation of the entire tile. This saves memory and enables an entire mask layer to be computed in tiles using independent distributed processes. The up-sampling may be performed by taking the discrete Fourier transform via FFT algorithms, extending the transform to higher frequencies corresponding to the higher sampling rate via periodic extension, multiplying the result by the low-pass filter in frequency space corresponding to the ideal filter multiplied by a localizing Gaussian in real space, and applying the inverse discrete Fourier transform via FFT algorithms. Stitching errors between tiles can be reduced to the point of elimination by adding more to the boundary of the tiles so that the mismatch occurs a prescribed number of Gaussian widths away from the tile edge. The foregoing describes the use of a Gaussian localizing factor, but other forms that limit spatial extent may be suitable as known to one skilled in the art. The sampling rates are also set higher than the Nyquist minimum rate so that the function bandwidth stays within the flat part of the filter in frequency space and to a prescribed accuracy.

The present methods enable graphical processing unit (GPU) acceleration due to regular grid-structured computations. The FSAs are conducive to GPU computations because many grids can be processed simultaneously. The computations involve single instruction, multiple data (SIMD) operations, with no contour-chasing. Exact function resampling is achieved via highly optimized FFTs. GPU computation time is greatly reduced due to reduction in data transfer time, since the amount of grid sample data that needs to be held in memory is based on using only the coarsest grid necessary to exactly represent the functions, and because in some embodiments the iterations associated with each tile can be computed on a compute node comprised of one or more GPUs. The minimization of data transfer to/from the GPU is important because a GPU is extremely fast at computing but typically limited by its data transfer rate. The present methods increase the area of a tile that can fit in a given memory size by 4 to 10 times compared to conventional methods, with a corresponding 5× to 10× reduction in overhead and 5× to 10× reduction in seams between tiles.

Use of localized Fourier interpolation via FFTs and a localization function that confines the effects of mismatched boundaries to a specified distance allows computations to operate on whatever resolution grid is most appropriate, and only store quantities that persist through the optimization on their minimum grids. Without this, the memory requirements become impossible to meet for calculating a mask layer for an entire tile on a single node. Another benefit of the present methods is that the computation of the cost function and its derivatives is distributed using large tiles with sufficient overlap to allow for the lithographic imaging proximity range and the localized Fourier interpolation range, while still optimizing all the mask parameters over the entire tile without stitching artifacts when the tiles are reassembled.

In some embodiments, using decomposition into tiles or partitions with their respective halos, independent evaluation of each tile's or each partition's contribution to the cost functional and derivatives can be performed, and the benefits of band-limited, smooth functions allow a single node to hold values for a large design area due to memory efficiency. Tiling the entire design or in some embodiments partitioning within a tile also enables computation acceleration, such as using GPUs, which is further enabled by regular grid-based computations and leverage from FFTs as needed.

Optimizing Independent Tiles of the Entire Design

Figure 10B:
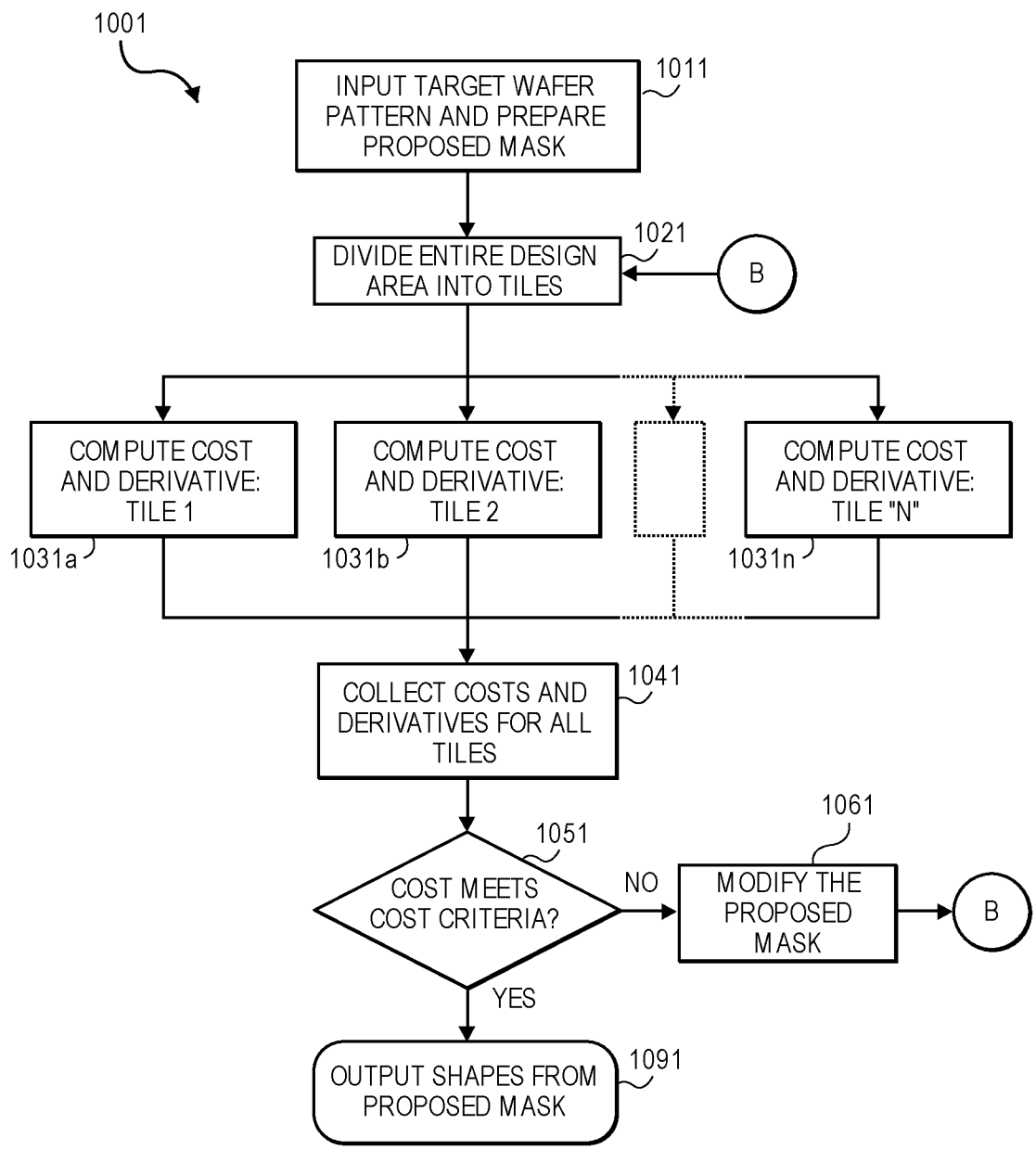
FIG. 10B is an embodiment of distributed computation for RET according to embodiments of the present disclosure, in which the entire design iterates over an optimization loop for some time.

FIG. 10A is an example flowchart 1000 of conventional distributed computing for RET, while FIG. 10B is an example flowchart 1001 of distributed computation for reticle enhancement technology on a global level that is possible with the methods described in U.S. Pat. No. 10,657,213, "Modeling of a Design in Reticle Enhancement Technology," which is owned by the assignee of the present application. Those methods, as shall be described in relation to FIG. 10B, iterate on the optimization of a large section of a mask layer, such as the whole mask layer instead of iterating on the optimization of each tile separately as depicted in the prior art example of FIG. 10A. In step 1010 of the conventional method of FIG. 10A, a design and mask are represented. The mask is divided into tiles in step 1020. Each tile with its large halo region is individually iterated in step 1030a/b . . . n, where the cost and derivative are calculated in step 1030a/b . . . n, and the proposed mask for each tile is modified in step 1060a/b . . . n if the cost does not meet the cost criteria in step 1050a/b . . . n. After each tile has been optimized, a mask is assembled from the tiles in step 1070. Thus, in conventional methods, a design is broken up into tiles and the individual tiles go through an optimization loop; then the full design of a large area is assembled back together out of the tiles. A well-known issue with all prior art systems is "stitching" when the tiles are reassembled. A final step 1085 in FIG. 10A is required to resolve resulting stitching errors.

In FIG. 10B that shows methods for reticle enhancement technology, the entire design iterates over an optimization loop. In every loop iteration, the data for each tile's halo is refreshed from the adjacent tiles. Therefore, there will be no discrepancies in the data being processed by adjacent tiles, avoiding stitching errors or the need to resolve them. In step 1011 of flowchart 1001, for example an entire target wafer pattern and a proposed mask, such as a continuous tone mask (CTM), are prepared. The design for the entire target wafer pattern may be, for example, an entire mask layer of a chip design. The target wafer pattern spans an entire design area. In some embodiments, the target wafer pattern and corresponding proposed mask in step 1011 may each be represented as a function sample array. Step 1011 corresponds to steps 920, 930, and 940 of FIG. 9A. In step 1021, the entire design area is divided into a plurality of "N" tiles.

The proposed mask, such as a CTM, of the entire design area is iterated as indicated by loop "B" in FIG. 10B, where in an iteration, each tile is computed independently from any other tile. The computing of each tile and its halo region in steps 1031a, 1031b, through 1031n, includes computing a cost and derivative data for each tile. Step 1031a/b . . . n corresponds to steps 950 and 960 of FIG. 9A. The cost and the derivative data are based on comparing the target wafer pattern and a predicted wafer pattern that will be produced by the proposed mask (e.g., CTM). All tiles are computed in a distributed process on a computing cluster.

Each iteration also includes step 1041 of collecting the costs and the derivative data for all tiles in the plurality of tiles to calculate a cost for the entire design area. In some embodiments, the collected costs include costs for reliable manufacturability of the mask as discussed in step 960 and 995. If the cost does not meet the cost criteria in step 1051, the costs and the derivative data are further iterated to modify the proposed mask in step 1061. Step 1051 corresponds to steps 970 and 980 of FIG. 9A, and step 1061 corresponds to step 990 of FIG. 9A. The process is then iterated as indicated by loop B. In step 1091, after the cost has been determined to meet the cost criteria, the proposed mask is converted to contoured shapes which are output to a mask for the entire design such as a QTM. Further processing of mask shapes for reliable manufacturing of masks, for MPC, or for format output as described in step 995 apply to step 1091. Variations on the process depicted in FIG. 10B include: (1) in some iterations, not optimizing tiles which have met optimization criteria and are known to have not had their halo data change; (2) re-tiling the design and/or proposed mask after a criterion has been met, such as a number of tiles meeting optimization criteria or a number of iterations have been performed; (3) using different optimization techniques for some of the iterations; and/or (4) only optimizing tiles that have high cost for a few iterations before continuing to optimize the entire design.

Figure 10C:
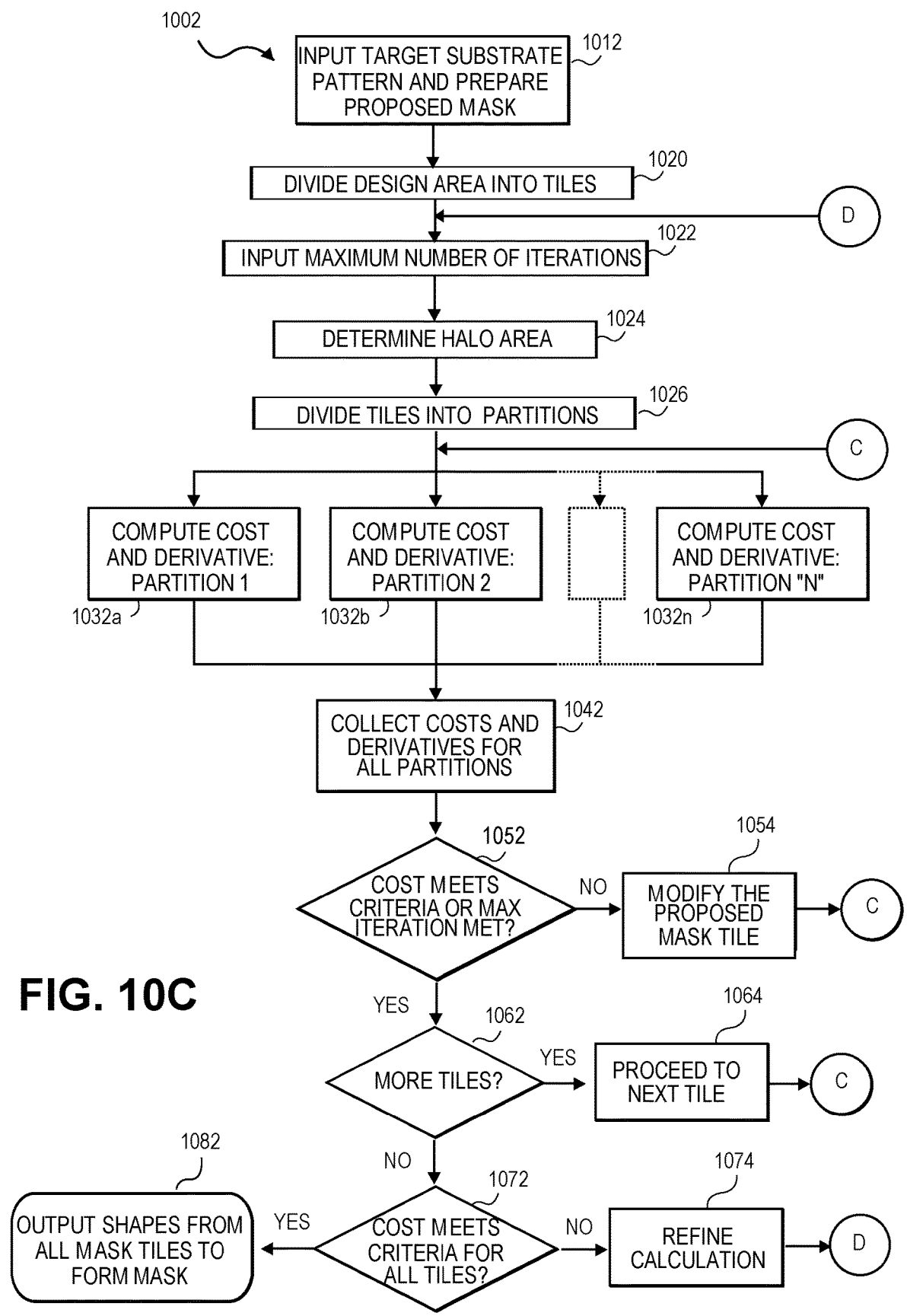
FIG. 10C is an embodiment of distributed computation for RET according to the present disclosure, in which tiles of the entire design iterate independently over an optimization loop for some time, and mask tiles are combined for the entire design without detectable stitching errors.
Figure 11A:
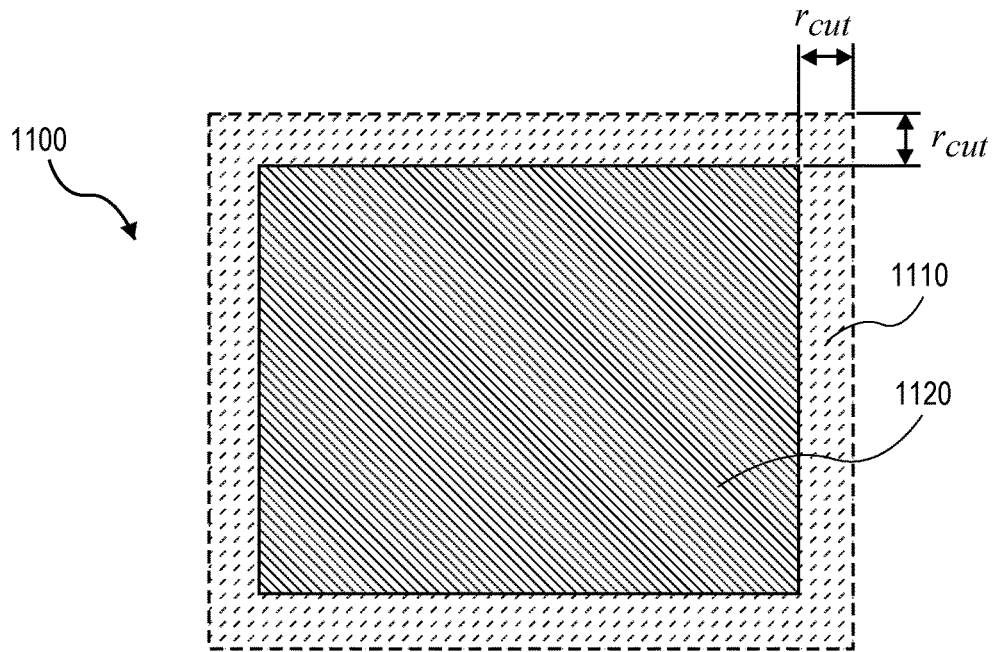
FIGS. 11A-11B show embodiments of computational regions with boundary areas.
Figure 11B:
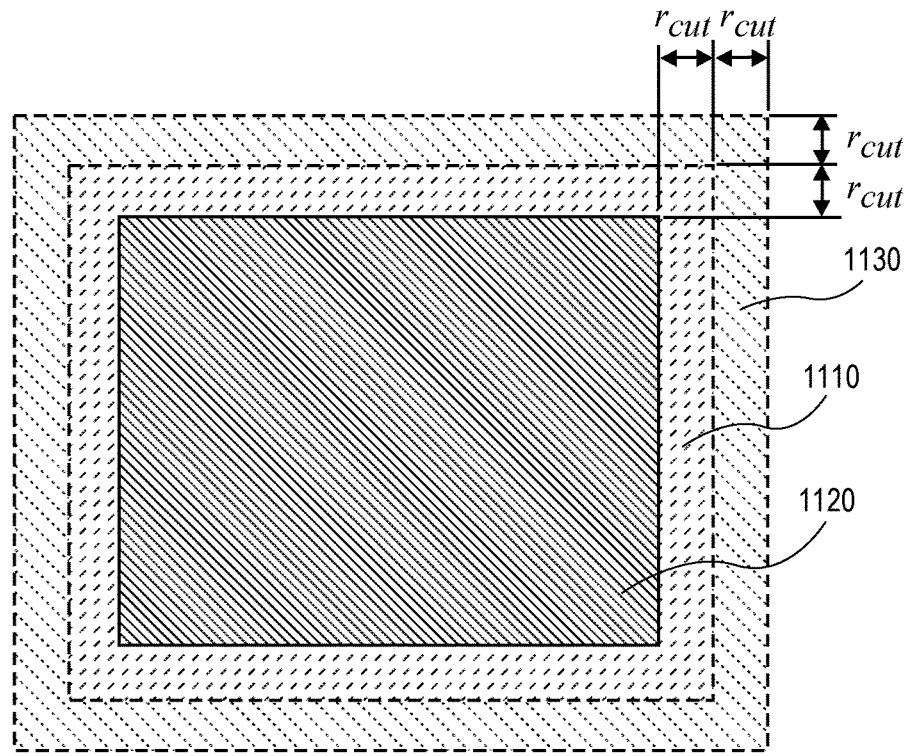
Figure 11C:
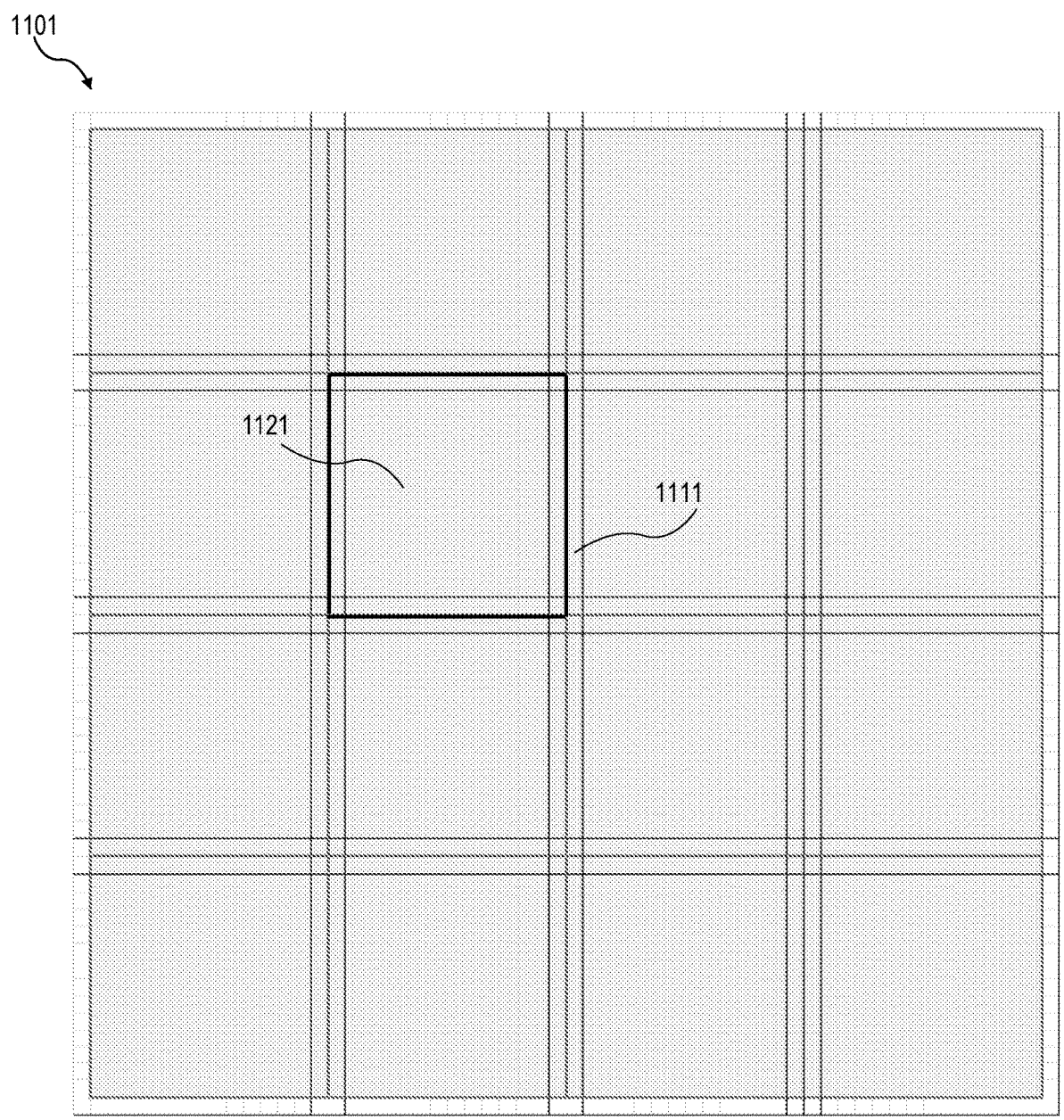
FIG. 11C shows how an entire design can be divided into tiles with overlapping halo regions according to an embodiment of the present disclosure.
Figure 11D:
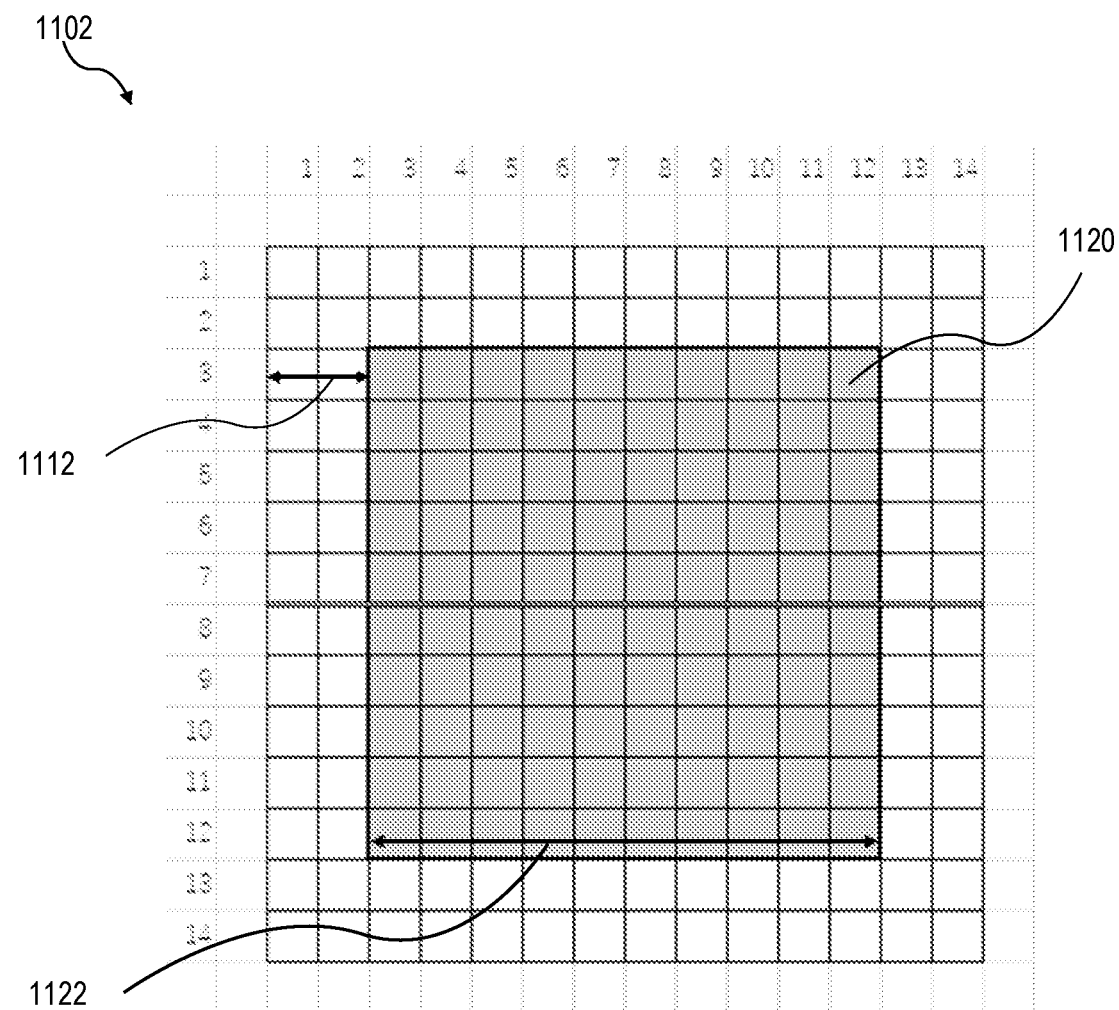
FIG. 11D illustrates a tile sub-divided into partitions according to an embodiment of the present disclosure.

FIG. 10C shows methods for distributed computation for RET according to the present disclosure, in which mask tiles of the entire design iterate independently over an optimization loop for some time. In step 1012 of flowchart 1002, an entire target substrate pattern, such as a target wafer pattern, is input and a proposed mask, such as a continuous tone mask (CTM), is prepared. The design for the entire target substrate pattern may be, for example, an entire mask layer of a chip design. The target substrate pattern spans an entire design area. In some embodiments, the target substrate pattern and corresponding proposed mask in step 1012 may be represented as a function sample array. Step 1012 comes after step 910 of FIG. 9A and corresponds to steps 920, 930, and 940. In step 1020, the entire design area such as entire design 1101 illustrated in FIG. 11C is divided into a plurality of "N" tiles 1121. In some embodiments, in step 1026 of FIG. 10C each tile of width 1122 may be further divided into a plurality of "N" partitions 1120 as shown in FIG. 11D. Note that in flowchart 1002, variations are possible. For example, steps 1020 and 1026 can be combined in one step. The maximum number of iterations that a proposed mask tile, or if further divided the proposed mask tile's partitions, will go through is established in step 1022. A pre-determined maximum number of iterations may be determined to ensure calculations for the mask tile will be correct at the perimeter of the tile. Step 1022 can occur before, during or after step 1020. In step 1024, the maximum number of iterations that a mask tile, or if further divided the mask tile's partitions, will go through determines the width of the halo of the tile (halo width 1112 of FIG. 11D), and if the tile is further subdivided, the width of the combined halos 1110 and 1130 of individual partitions 1120 as shown in FIG. 11B. In order to calculate the change in cost for a change in mask value in a partition 1120 during each iteration, the image for the partition needs to be correct out to and including the first halo 1110. In the present disclosure, this condition is achieved by adding a second, expanded halo 1130 of mask values, as shown in FIG. 11B. Adding the second halo 1130 obtains correct image values in the partition 1120 and its first halo 1110, which in turn allows correct calculation of the functional derivative for mask values within the partition 1120 itself.

For each tile (tile 1121 of FIG. 11C) in the plurality of tiles for the entire design 1101, the halo area 1111 comprises portions of adjacent tiles. The tile 1121 and the halo area 1111 comprise an extended tile 1102 in FIG. 11D that is iteratively optimized to produce a predicted substrate pattern at the perimeter of the proposed mask tile that matches adjacent predicted substrate patterns that will be independently calculated at the perimeter of adjacent proposed mask tiles, for the determined maximum number of iterations. If the mask tile is partitioned, all relevant partitions of the mask tile including their halos regions 1110 and 1130 are updated with each iteration of the mask tile, up to the maximum number of iterations.

In some embodiments, the computing of data in each partition 1120 and its halo region (comprised of 1110 and 1130 of FIG. 11B) in steps 1032a, 1032b, through 1032n, includes computing a cost and derivative data for each partition of the mask tile. It should be noted that computing of data in each partition is similar to that of the method of 10B, where halos of adjacent regions are updated simultaneously. This can be achieved because all partitions are in memory for the tile. If sufficient compute power is available, it may not be necessary to sub-divide a tile into partitions. In such a case, a tile can be processed as a single partition during each iteration as shown in step 1032a of FIG. 10C. Step 1032a/b . . . n corresponds to steps 950 and 960 of FIG. 9A. During each iteration, cost and the derivative data are collected for all partitions of the mask tile in step 1042 of FIG. 10C. Cost and derivative data are based on comparing the target substrate pattern and a predicted substrate pattern produced by the proposed mask tile (e.g., CTM). If costs do not meet cost criteria in step 1052 and the maximum number of iterations has not been reached, the proposed mask tile is modified in step 1054 through a new iteration indicated by loop C. If the costs meet criteria, or a maximum number of iterations is met even if costs still have not met criteria, the method proceeds to step 1062.

The proposed mask tile, such as a CTM, is iterated following steps 1032a/b . . . n, 1042, 1052, and 1054 of FIG. 10C until costs and derivatives meet cost criteria for the mask tile, or until the maximum number of iterations has been reached. Each mask tile is iterated independently from any other mask tile. When all cost criteria are met for the mask tile or the maximum number of iterations has been reached, the mask tile is saved for assembly with the plurality of mask tiles. If more tiles remain to be processed in step 1062, the node can proceed to the next tile in step 1064 to complete a new set of independent iterations following steps 1032a/b . . . n, 1042, 1052, and 1054 of FIG. 10C. All tiles can be computed independently on separate nodes or computing platforms, or in a distributed process on one HPC cluster.

After all mask tiles of the entire design have been processed, the cost and functional derivative of the cost are gathered for all tiles in step 1072. If all costs meet criteria for all areas of the entire design, in step 1082 every mask tile in the plurality of mask tiles is converted to contoured shapes which are output to a final mask tile, such as a QTM, and reserved for assembly with shapes from the other independently iterated mask tiles for the entire design. If any costs fail to meet established criteria when cost and functional derivative of the cost are gathered for all tiles in step 1072 (because the maximum number of iterations was reached and costs did not meet criteria), the calculation is refined in step 1074, and relevant tiles of the entire design undergo a newly determined maximum number of iterations taking into account a newly determined halo area for the new loop D. Loop D can be repeated until all costs meet criteria for all areas of the entire design in step 1072. With this procedure, all shapes output from proposed mask tiles are combined without the need for further optimization or stitching to form a mask, such as a QTM, for the entire design.

In some embodiments, the costs computed include costs for reliable manufacturability of the mask as discussed for flow 900 illustrated in FIG. 9A in steps 960 and 995. If the cost does not meet the cost criteria in steps 1052 and 1072, the cost and functional derivative of the cost are further iterated to modify the proposed mask, either for an individual mask tile or for a portion of the entire design as described above. Steps 1052 and 1072 correspond to steps 970 and 980 of FIG. 9A. Steps 1054 and 1074 to modify the proposed mask correspond to step 990 of FIG. 9A. Further processing of mask shapes for reliable manufacturing of masks, for MPC, or for format output as described in step 995 of flow 900 in FIG. 9A apply to step 1082 of FIG. 10C.

Variations on the process depicted in FIG. 10C include: (1) in some iterations, not optimizing partitions within tiles which have met optimization criteria and are known to have not had the data in the halo areas change; (2) re-partitioning a proposed mask tile after a criterion has been met, such as a number of iterations have been performed; (3) using different optimization techniques for some of the iterations; and/or (4) only optimizing partitions within a tile that have high cost for a few iterations before continuing to optimize the entire mask tile.

In some embodiments of methods for iteratively optimizing a proposed lithographic mask, a pre-determined maximum number of iterations is input. The proposed lithographic mask is divided into a plurality of proposed mask tiles. For each proposed mask tile in the plurality of proposed mask tiles, a halo area around the proposed mask tile is determined, where the halo area comprises portions of adjacent proposed mask tiles, and where the proposed mask tile including the halo area comprises an extended tile (i.e., an extended tile is made of a mask tile and its halo area). The extended tile is iteratively optimized, where each iteration includes 1) performing one iteration of optimization for the extended tile; and 2) repeating step 1) if (i) the extended tile after performing step 1) does not satisfy a cost criteria, and (ii) a number of iterations for the extended tile is less than the pre-determined maximum number of iterations. Optimizing the extended tile produces a predicted substrate pattern at a perimeter of the proposed mask tile that matches adjacent predicted substrate patterns that are calculated at perimeters of adjacent proposed mask tiles. After completing the iterative optimizing for the plurality of proposed masked tiles, the plurality of proposed mask tiles is combined into an optimized proposed mask. Some embodiments include repeating the steps of inputting the maximum number of iterations, iteratively optimizing the extended tile, and combining the plurality of proposed mask tiles in order to refine optimization.

Some embodiments include inputting a target substrate pattern. In further embodiments, the iterations for the extended tile are performed on a computing platform having an aggregate total memory of one or more nodes of the computing platform, where a single node of the computing platform holds the target substrate pattern for the area of the extended tile. Some embodiments further include representing the extended tile as either a continuous tone mask (CTM) smooth function captured as a function sample array (FSA) or a quantized tone mask (QTM) smooth function captured as an FSA, wherein the FSA for the CTM or the QTM is an array of function values which can be real numbers, complex numbers, or an aggregate of numbers. In some embodiments, the cost criteria includes calculating a cost and a derivative data, the cost and the derivative data being based on comparing the predicted substrate pattern to the target substrate pattern for the extended tile, wherein the cost is also represented as a smooth function; and updating the CTM or the QTM with the cost and the derivative data. In some embodiments, a sharp threshold is applied to the QTM to extract contours to secure geometric shapes for the optimized proposed mask. Some embodiments further include representing the target substrate pattern as a function sample array (FSA), where the representing of the target substrate pattern as an FSA comprises applying a low-pass filter to the target substrate pattern. The FSA for the target substrate pattern may be band-limited to a spatial frequency cutoff of a substrate lithography system and is sampled on a grid that meets a Nyquist criterion. In some embodiments, the target substrate pattern is for a mask layer of a semiconductor chip. In some embodiments, a halo area has a width around the proposed mask tile that is 1.5 to 4 times a lithographic imaging proximity range cutoff of a pre-determined substrate lithography system for each iteration. In some embodiments, the methods further include dividing the extended tile into one or more partitions.

In some embodiments of methods of iterative processing for a two-dimensional tiled area, a pre-determined maximum number of iterations is input. A halo area around each tile in the tiled area is determined, where the halo area comprises portions of adjacent tiles, and where the tile and the halo area comprise an extended tile. The methods also include iterating calculation of a pattern for the extended tile, ensuring the pattern is correct at the perimeter of the tile for the pre-determined maximum number of iterations. Each iteration comprises 1) performing one iteration of the calculations of the pattern for the extended tile; and 2) repeating step 1) if the calculated pattern does not satisfy a pre-determined criterion and if a number of iterations for the extended tile is less than the pre-determined maximum number of iterations. After completing the iterating for all the tiles in the tiled area, the calculated patterns for all the tiles are combined.

In some embodiments, the iterative processing is for a reticle enhancement technology (RET). In some embodiments, the methods further include inputting a target substrate pattern, the target substrate pattern spanning an entire design area. In some embodiments, each iteration further comprises updating the extended tile, wherein the extended tile is a continuous tone mask (CTM); and representing the CTM as a smooth function captured as a function sample array (FSA), where the FSA is an array of function values which can be real numbers, complex numbers, or an aggregate of numbers. In some embodiments, the calculated pattern for the tile is a predicted substrate pattern; and the method further comprises representing the predicted substrate pattern as a smooth function captured as a predicted pattern function sample array (FSA), where the predicted pattern FSA is an array of function values which can be real numbers, complex numbers, or an aggregate of numbers. In some embodiments, the methods further include representing the target substrate pattern as a smooth function captured as a target substrate pattern function sample array (FSA), where the target pattern_FSA is an array of function values which can be real numbers, complex numbers, or an aggregate of numbers. The representing of the target substrate pattern as a target pattern FSA may include applying a low-pass filter to the target substrate pattern. In some embodiments, the target pattern FSA is band-limited to a spatial frequency cutoff of a substrate lithography system and is sampled on a grid that meets a Nyquist criterion. In some embodiments, the calculating for each extended tile further comprises calculating a cost and a derivative data, the cost and the derivative data being based on comparing the predicted substrate pattern to the target substrate pattern, where the cost is also represented as a smooth function. In some embodiments, the methods include converting the CTM to a quantized tone mask (QTM) and representing the QTM as a smooth function captured as a function sample array (FSA), wherein the FSA is an array of function values which can be real numbers, complex numbers, or an aggregate of numbers. In some embodiments, the methods include applying a sharp threshold to extract contours from the QTM to secure geometric shapes for the combined calculated patterns.

In example embodiments, a target substrate pattern, such as a target wafer pattern, or a predicted substrate pattern, such as a predicted wafer pattern, is represented as a smooth function captured as a function sample array (FSA), where the FSA is an array of function values which can be real numbers, complex numbers, or an aggregate of numbers. A CTM is provided, where the CTM is used to produce the predicted wafer pattern, the predicted wafer pattern spanning an entire design area. In some embodiments, the entire design is divided into a plurality of tiles, and the CTM is iterated within each tile in the plurality of tiles until the proposed mask tile meets a criterion towards producing the target wafer pattern for that region of the design. Each iteration includes calculating a predicted wafer pattern for a tile in the plurality of tiles and updating the proposed mask tile used to produce the predicted wafer pattern before the next iteration, producing an optimized mask tile. In some embodiments, the iteration can include dividing the proposed mask tile into one or more partitions, making calculations for every partition in the tile and the tile's halo region, where all partitions are calculated before the next iteration. In some embodiments, the optimized mask tile is further processed for reliable manufacture, for MPC, or for format output until the costs meet cost criteria. The optimized mask tile is converted from a continuous tone mask (CTM) to a quantized tone mask (QTM) for reliable manufacture. In some embodiments, the calculating is performed on a computing platform having an aggregate total memory of one or more nodes of the computing platform, where the aggregate total memory of a single node holds a portion of the target wafer pattern and a proposed mask tile of the same area of the entire design area for each iteration. In some embodiments, the calculating of the proposed mask tile further includes calculating cost and derivative data, the cost and the derivative data being based on comparing the predicted wafer pattern to the target wafer pattern. The cost may also be represented as a smooth function, where the smooth function for the cost can be different from the smooth functions for the target wafer pattern, predicted wafer pattern, CTM, or QTM. The cost may also be referred to in this disclosure as a cost function. In some embodiments, after using the cost and the derivative data to update the CTM, the CTM is converted to a QTM for that tile. In some embodiments, the proposed mask tile is represented as a CTM smooth function captured as a function sample array (FSA), and in other embodiments it is represented as a QTM smooth function captured as a function sample array (FSA), where the FSA is an array of function values which can be real numbers, complex numbers, or an aggregate of numbers. The FSA for the two types of tone masks can be different from the FSA for the target wafer pattern or the predicted wafer pattern. For example, the target wafer pattern can be represented by a first FSA, the CTM can be represented as a second FSA, the predicted wafer pattern can be represented by a third FSA, and the QTM can be represented by a fourth FSA.

In some embodiments, each tile has a halo region surrounding the tile. The calculating is calculated for the tile and its halo region; and each iteration further includes updating the proposed mask tile in the plurality of tiles, after calculating the predicted wafer pattern and comparing it to the target wafer pattern for the tile. In certain embodiments, the halo region for a tile in the plurality of tiles has a thickness surrounding the tile that is 1.5 to 4 times a lithographic imaging proximity range cutoff of a pre-determined substrate lithography system for each iteration of the RET.

In some embodiments, the calculating of the tile in the plurality of is performed on a compute node accelerated by one or more graphical processing units. In some embodiments, the representing of the target wafer pattern as an FSA includes applying a low-pass filter to the target wafer pattern. In some embodiments, the FSA for the target wafer pattern is band-limited to a spatial frequency cutoff of a substrate lithography system, and optionally may be sampled on a grid that meets a Nyquist criterion. In some embodiments, the target wafer pattern is for a mask layer of a semiconductor chip. In some embodiments, a sharp threshold is applied to the QTM to extract contours to secure geometric shapes for the mask.

In other example embodiments, a method for RET includes inputting a target wafer pattern, the target wafer pattern spanning an entire design area. The entire design is divided into a plurality of tiles, each tile having a halo region surrounding the tile. A proposed mask tile in the plurality of tiles, which may be a CTM, is iterated until the proposed mask tile meets criteria towards producing the target wafer pattern for that tile. Each iteration includes calculating a predicted wafer pattern for a tile in a plurality of tiles, where the calculating is performed for the and its halo region. Each iteration also includes updating the proposed mask tile, where all calculations are performed before the next iteration. The tile can include one or more partitions, such as spanning a large section of the design. Partitions within a tile that have already met optimization criteria, or that have already been iterated a certain number of times, need not be included in every iteration.

In some embodiments, the proposed mask tile is a continuous tone mask (CTM), and the CTM is represented as a smooth function captured as a Function Sample Array (FSA), where the FSA is an array of function values such as real number values, complex numbers, or an aggregate of numbers. The function values characterize the mask value at that grid point.

In some embodiments of the method of FIG. 10C, a proposed mask tile may be represented in some way other than a CTM or a related QTM. For example, the proposed mask tile may be represented as a modifiable mask tile with geometric shapes intended to produce a pattern, where each shape's edges can be broken up and manipulated near target pattern edges. In some embodiments, the CTM may be further regularized until it meets criteria for reliable manufacture, for MPC, or for format output. In some embodiments, the regularized CTM is converted to a QTM represented as a smooth function captured as a function sample array (FSA), wherein the FSA is an array of function values which can be real numbers, complex numbers, or an aggregate of numbers. A sharp threshold may be applied to the QTM to extract contours to secure geometric shapes for the mask tile.

In some embodiments, the predicted wafer pattern is represented as a smooth function captured as a Function Sample Array (FSA), where the FSA is an array of real number values, complex numbers, or an aggregate of numbers.

In some embodiments, the target wafer pattern is represented as a smooth function captured as a Function Sample Array (FSA), where the FSA is an array of real number values, complex numbers, or an aggregate of numbers. The function values characterize the target wafer pattern value at that grid point. The representing of the target wafer pattern as an FSA may include applying a low-pass filter to the target wafer pattern. The FSA for the target wafer pattern may be band-limited to a spatial frequency cutoff of a substrate lithography system and sampled on a grid that meets a Nyquist criterion.

In some embodiments, the calculating for each tile further includes calculating cost and derivative data, the cost and the derivative data being based on comparing the predicted wafer pattern to the target wafer pattern, where the cost is also represented as a smooth function.

Decomposition and Boundary Conditions

FFTs imply the imposition of periodic boundary conditions (PBCs), which must be addressed to use them successfully. The spatial localization of the substrate projection model means PBCs can be rendered mostly harmless by adding a halo of neighboring mask area to a region which is being worked on such as a tile or partition so that the convolution results are correct in the original region. The filter kernels describing the substrate projection model are indeed strictly band-limited in frequency, but their effects are also well-localized in space, at least when their weights are taken into account. This is consistent with the idea of a "lithographic imaging proximity effect." Mask values outside a lithographic imaging proximity range cutoff $r_{cut} \approx 5\text{-}10\lambda/NA$ do not affect what is printed in a region; therefore, most of the issues with PBCs can be avoided when calculating within a region by adding a halo of neighboring mask area and values.

To calculate a projected image correctly in a region, whether it is a tile or a partition, mask values are needed in a surrounding halo (boundary layer) of depth $r_{cut}$. The value $r_{cut}$ is a spatial localization distance. This is illustrated in FIG. 11A for region 1120 with its halo region 1110, where adding a first boundary layer (halo) 1110 of thickness $r_{cut}$ to tile 1120 enables computation of the image intensity. Changes in mask values in the central image computation region 1120 will affect the image over that region plus the first halo 1110. This is because the light energy spreads over an area. A light cast through a specific part of the mask will transmit energy on the substrate in the neighborhood. The distance of significant energy being cast determines the halo distance. Therefore, in order to get the change in cost for a change in mask value in the central region 1120, the image needs to be correct out to and including the first halo 1110. In the present disclosure, this condition is achieved by adding a second halo 1130 of mask values, as shown in FIG. 11B. In FIG. 11B, adding the second halo 1130 obtains correct image values in region 1100 (1120 with first halo 1110), which in turn allows correct calculation of the functional derivative for mask values within the central region 1120, equivalent to a tile in flow 1001 in FIG. 10B or to a partition of a tile in flow 1002 in FIG. 10C. Thus, for central region 1120, a base halo depth is twice the value of the $r_{cut}$.

If the region that is being calculated has a boundary that is one of the external boundaries of the entire layer, then a halo of new mask area to be optimized should be added, and another for the desired mask boundary value, such as fully transmitting or blocking. The new mask area to be optimized will allow the present pattern representation modeling methods to add sub-resolution assist features (SRAFs) for the layout near the edge, and its goal in this area would be to print nothing.

Flow 1002 of FIG. 10C shows methods for computation for RET according to the present disclosure where an entire mask layer can be decomposed into tiles 1121 with overlapping halo regions 1111 as shown in FIG. 11C. Each tile is further sub-divided or partitioned into smaller computational regions. Each of these sub-divided partitions covers about the same area as a tile used with the alternative methods shown in FIG. 10B.

For example, tile 1121 from FIG. 11C has been further partitioned into a 10×10 grid of computational regions equivalent in size to a tile using methods shown in FIG. 10B. For this example, each computational region or partition 1120 shown in FIG. 11D has an area of 3584×3584 grid points. For correct computation of this region, the partition must be surrounded by a base halo depth of 256 grid points in this example. Therefore, the region that is computed is 4096×4096 grid points. Using the base halo depth of 256 grid points for 28 iterations, tile 1121 would require a tile halo depth of 7168 grid points (calculated by multiplying the base halo depth by the number of iterations) without the need for halo updates for the partitions beyond the perimeter of the tile. Therefore, in this example, the halo width 1112 would then be 2 partitions for the tile that has a width 1122 of 10 partitions in FIG. 11D. With such a sufficiently large halo region, data in adjacent tiles are effectively taken into account. In every loop iteration, relevant data in every partition of the tile are updated, including partitions in the tile's halo region. Therefore, as with the more wholistic methods described in FIG. 10B, discrepancies in the data being processed by adjacent tiles across the entire design are effectively eliminated. Once optimized, the resulting mask tiles are legalized and recombined to form a mask for the entire design.

If everything is represented on the finest grid needed, all is well, except for potentially onerous memory requirements. Standard Fourier interpolation, which can be used to avoid blanket oversampling, invites a new ripple problem due to the PBCs. Fourier interpolation to resample from the mask or image grid to a finer cost functional grid, for example, can still be a problem, because it is inherently nonlocal in nature. Any mismatch due to the PBCs will result in ripples that decay only as 1/R, where R is the distance from the boundary. Solutions must be found to mitigate the ripples, or the mask must be oversampled to the cost functional grid, which increases the amount of memory needed to store it by one or two orders of magnitude or more. Embodiments of the present disclosure address this resampling problem by applying a localized filter, such as an ideal low-pass filter with a Gaussian envelope factor, as discussed previously.

Decomposition Without Stitching of Solutions

There are two main data distribution options for distributed computing strategies to harness enough computing power and memory to handle constructing the band-limited continuous tone mask (CTM): 1-D strip decomposition or 2-D tile decomposition. The 1-D decomposition enables the 2-D FFT operation itself to be parallelized. The present methods achieve a 2-D decomposition, but do not result in stitching problems as in conventional methods.

1-D decomposition requires a lot of memory, and there can be arithmetic precision issues computing FFTs on very large arrays. The 1-D decomposition of an entire mask layer across multiple graphical processing units (GPUs), central processing units (CPUs), and compute nodes is intended to allow parallelizing 2-D FFTs over the mask layer. In some embodiments, the "computational unit" for this decomposition can be essentially the entire mask layer, since everything will proceed as if handled all at once. In particular, any temporary quantities required for improving the CTM will be computed and held for the entire mask layer before their storage is released. The entire mask layer is computed at once so there can be no stitching problems. For the present embodiments associated with flow 1002 in FIG. 10C, the "computational unit" for this decomposition is a single tile 1121 including its halo region 1111 which is computed independently from the plurality of tiles, and everything will proceed within a single tile as if handled all at once. For the present application, any temporary quantities required for improving the CTM will be computed and held for the entire region of the tile, rather than for the entire design, before their storage is released. Because a sufficiently large tile base halo depth is taken into account for each iteration, the tiles can be recombined to form the entire design with no stitching problems.

A 2-D FFT operation involves doing all 1-D FFTs along one axis, followed by all 1-D FFTs along the other axis. Therefore, with the strip decomposition, all local 1-D FFTs are done first (along the length of each strip), a communication step is performed to change the decomposition axis, and then all 1-D FFTs along the (now local) second axis are done.

With many 2-D FFTs to perform along with other calculations, there is an opportunity to make a pipeline that hides most of the communication overhead with overlapped computations. The main challenges are storage to hold intermediate quantities for the entire mask layer on fine grids, and possible precision issues when computing FFTs on very large arrays. One main advantage to computing across the entire mask layer is that there is no stitching of strips back together, so the stitching problems that plague the simplest 2-D decomposition approaches are completely avoided.

In the present disclosure, the 2-D tiled decomposition does not directly handle an entire mask layer at once, but achieves the same effect, and without any stitching. The 2-D decomposition localizes all computations to the tiles (plus their halos), so this is the computational unit. In some embodiments, the contribution to the total cost and the derivatives of the cost with respect to each tile's mask values can be computed completely independently. Fine grid quantities like cost densities are temporary, and there only needs to be enough memory to accommodate temporary values for the number of tiles being worked on concurrently. When all tiles have had costs and derivatives computed, the net result will be as if the entire mask layer was handled as a unit, but without ever needing to store intermediate values for the whole except as desirable for check-pointing for error recovery or debugging.

The methods shown in FIG. 10C for the present disclosure obviate the need for an optimization step across the entire mask layer at this point, followed by a communication phase to update halo data of each neighboring tile for the next iteration. There is no need to exchange tile data with neighboring tiles by memory sharing, local copying, by message-passing in a distributed system, or by other means.

In some embodiments, each tile is selected to allow all its local computations to be resident in a single node GPU(s) while allowing for pipelining of GPU computations and data transfers to and from main memory. The computations may be performed at double, single, half or other floating-point precision, or in various integer formats, according to the needs of speed, memory, and accuracy.

The present methods enable seamless optimization over very large fields and effectively eliminate the effects of the PBC mismatch when interpolating, thus enabling a viable approach for 2-D parallel decomposition where each tile is a computational unit, where temporary memory requirements are limited to those tiles being handled concurrently, where the entire mask layer is optimized tile by tile, and where ongoing memory requirements while optimizing involve a few quantities on the grid used for the band-limited mask.

Figure 12:
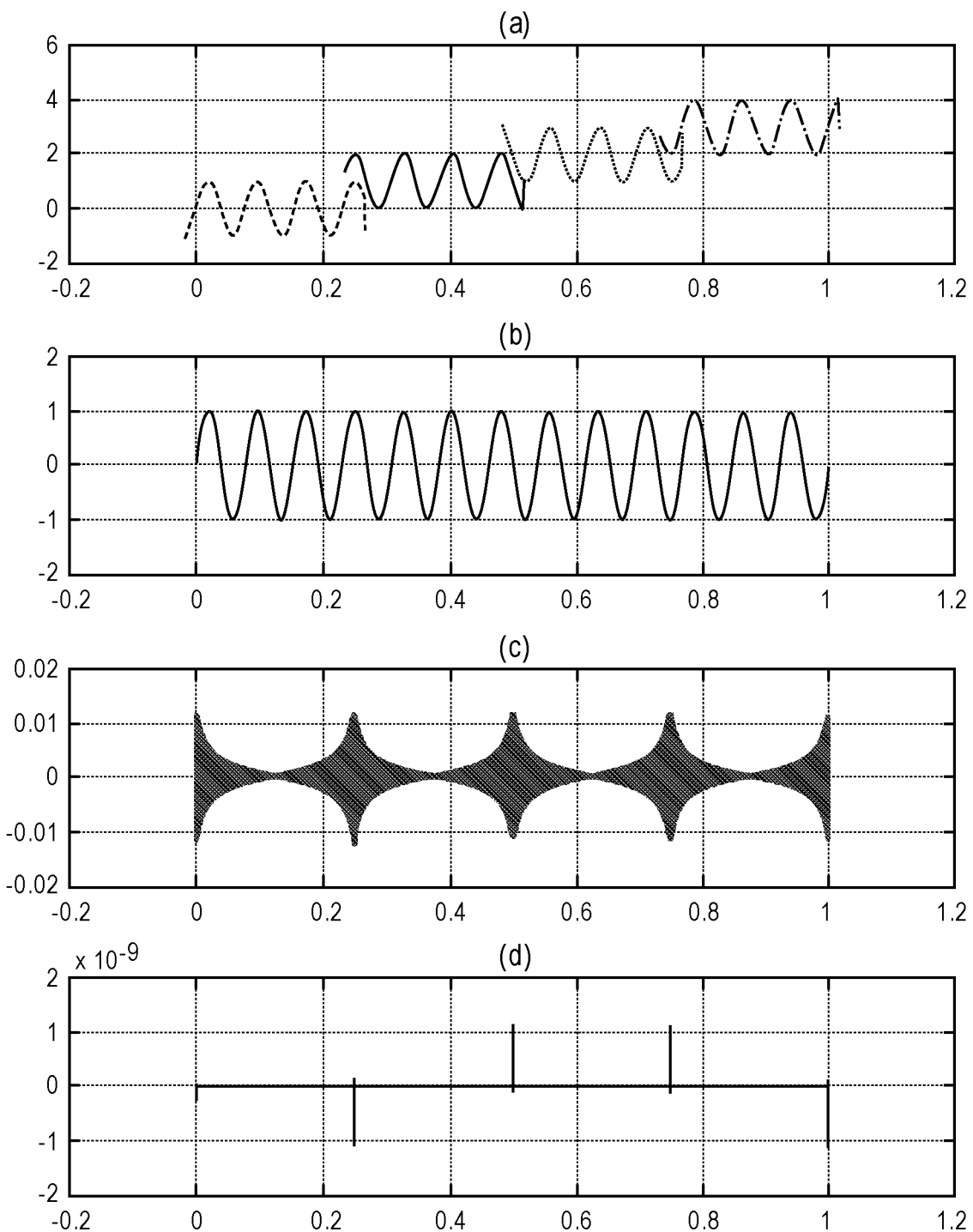
FIG. 12 illustrates a 1-D example of Gaussian-localized interpolation on overlapping tiles.

A 1-D example is presented in FIG. 12, which illustrates doing interpolation, such as Gaussian-localized interpolation, on a long run of data inside a tile that is handled as four linearly abutting partitions which overlap in their halos. The underlying curve is thirteen cycles of a sinusoid evaluated at 1024 sample points, and the Gaussian width parameter used is s=4 samples. The data is broken up into four equal-sized partitions with overlap halos of sixteen samples. The four abutting partitions, each with their halos, with conventional Fourier-interpolation onto a 10× finer grid, are shown in FIG. 12(*a*) with vertical offsets for clarity. Note the ringing at the ends of each curve in the partition's halo regions. The curve as reassembled from the central partition regions is shown in FIG. 12(*b*) for both regular Fourier interpolation and Gaussian-localized Fourier interpolation. The discrepancy between the curves is too small to be seen at this scale. To investigate further, the difference between the reassembled Fourier-interpolated curve and the ideal sinusoid was plotted in FIG. 12(*c*). The discrepancies reach the 1% level at the partition boundaries and show a long range into the center of each partition. In contrast, the discrepancy for the Gaussian-localized Fourier interpolation shown in FIG. 12(*d*) only reaches a part in $10^9$ at the partition boundaries and then decays extremely quickly from there.

Legalization

In the present disclosure, a continuous tone mask (CTM) can be transformed to a reliably manufacturable mask. Modifications can be made to the CTM and/or to the QTM to ensure that the mask is manufacturable.

In some embodiments, the iterative optimization of the CTM uses costs related to reliable manufacturability of the mask shapes. In some embodiments, a set of constraints related to reliable manufacturability of the mask shapes prohibit certain shapes to be considered. In some embodiments, after the cost criteria is met, mask shapes may be further modified to fit the exact specifications for mask manufacturability. Costs and criteria for mask manufacturability include, but are not limited to, minimum size and spacings, maximum curvature allowed, minimum dose margin and mask edge error factor (MEEF). Optimization of MEEF and other factors are disclosed in U.S. Pat. No. 8,719,739, "Method and System for Forming Patterns Using Charged Particle Beam Lithography," which is owned by the assignee of the present application.

The CTM has a continuous range of values that must be converted to contiguous regions of allowed transmission values. The contiguous regions of fixed transmission value correspond to shapes on a manufacturable mask. The allowed transmission values depend on the type of mask; for example, they are conventionally 0 or 1 for a chrome-on-glass mask, or $-\sqrt{0.06}$ and 1 for a 6% attenuated phase shift mask.

In an embodiment, this conversion is accomplished through regularization, which involves adding terms to the cost or cost function, that favor manufacturable masks.

The primary regularization needed is to favor masks that are very close to the allowed transmission values everywhere, with a possible exception for transitions from one allowed value to another, which may contain intermediate values. In an embodiment, a term, which shall be referred to as a "value-shaping term," is introduced that favors the allowed values and favors short transitions between a region of one value to a bordering region of another value.

A CTM that is selected using a value-shaping term in the optimization may contain shapes that will be difficult to manufacture reliably. In an embodiment, a second value-shaping term is introduced that favors shapes that will have good dose margin when manufacturing the mask. Such a term may use a PSF to measure how much the shapes change and compute a cost based on the changes.

Figure 15:
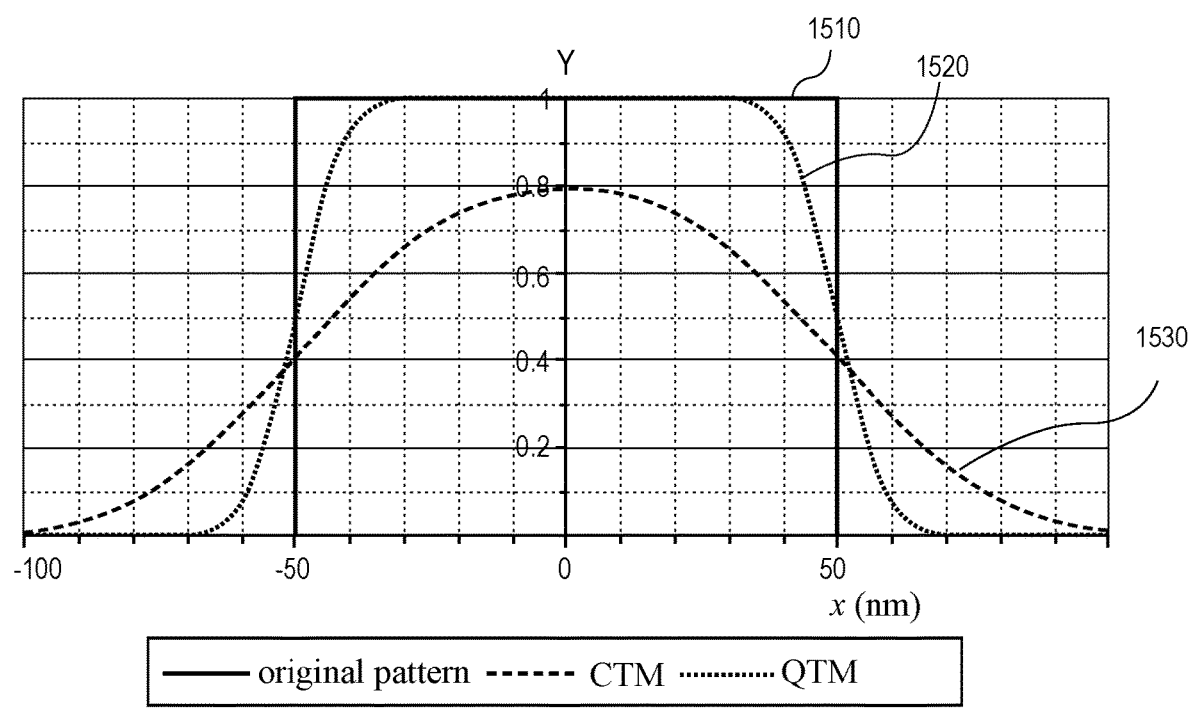
FIG. 15 illustrates a target pattern, with a corresponding CTM and QTM, according to embodiments of the present disclosure.

A large set of theoretical masks can provide good lithographic results on a wafer. Regularization selects from the subset of masks that can be manufactured, with a preference for those that can be reliably manufactured. A total cost system can be utilized to penalize masks that cannot be made while optimizing to reduce manufacturing penalty and while retaining good wafer results. FIG. 15 shows the relationship between the CTM 1530, QTM 1520, and an ideal two-tone mask 1510. In some embodiments, FIG. 15 compares the soft curve of a CTM (represented by the slope of CTM curve 1530) with a QTM (represented by the slope of QTM curve 1520), which is a 2-tone mask that allows short, smooth transitions between values. In this example, the QTM transitions from 0 to 1 in tone value in a short space (from x=-70 to -30 nm, and from x=30 to 70 nm). By comparison, the CTM never achieves a tone value of 1, and the transition from 0 to 0.8 in tone value for the CTM is continuous over a longer space (from x=-100 to 0 nm, and from x=0 to 100 nm. While it is computationally efficient, the grayscale CTM is not printable and must be converted to a printable mask. In the example shown in FIG. 15, the conversion from a CTM to a QTM effectively locates edges at a tone value of 0.5 to establish printable mask geometries from the grid points of the optimized function sample arrays. The short, smooth transitions between mask tones indicative of the QTM are reflected in the blur 1/10 curve (curve 820 of FIG. 8A) or the soft threshold of blur 1/3 curve (curve 832 of FIG. 8B), as well as curve 1520 of FIG. 15. By contrast, the longer, more continuous transitions indicative of the CTM are reflected in the blur 1/3 curve (curve 830 of FIGS. 8A and 8B) and curve 1530 of FIG. 15. In some embodiments, a cost function for mask feature size regularization can include a preference for features that can be created on a mask with fidelity and control. In practice smooth functions are used, but the main difference may be peak values in the middle of small features. The final QTM has regularized values and feature sizes, like rasterized shapes. Regularization includes extracting contours to get geometric shapes for the mask by applying a sharp threshold to the QTM.

Computation Systems

The computation and processing steps described in this disclosure may be implemented using general-purpose computers with appropriate computer software as computation devices. Multiple computers or processor cores may also be used in parallel. In some embodiments, a special-purpose hardware device, either used singly or in multiples, may be used to perform the computations of one or more steps with greater speed than using general-purpose computers or processor cores. In certain embodiments, the special-purpose hardware device may be a graphics processing unit (GPU). In other embodiments, other special-purpose hardware devices may be used as co-processors, such as a Digital Signal Processor (DSP), a Tensor Processing Unit (TPU), a Field-Programmable Gate Array (FPGA), or an Application-Specific Integrated Circuit (ASIC).

Figure 13:
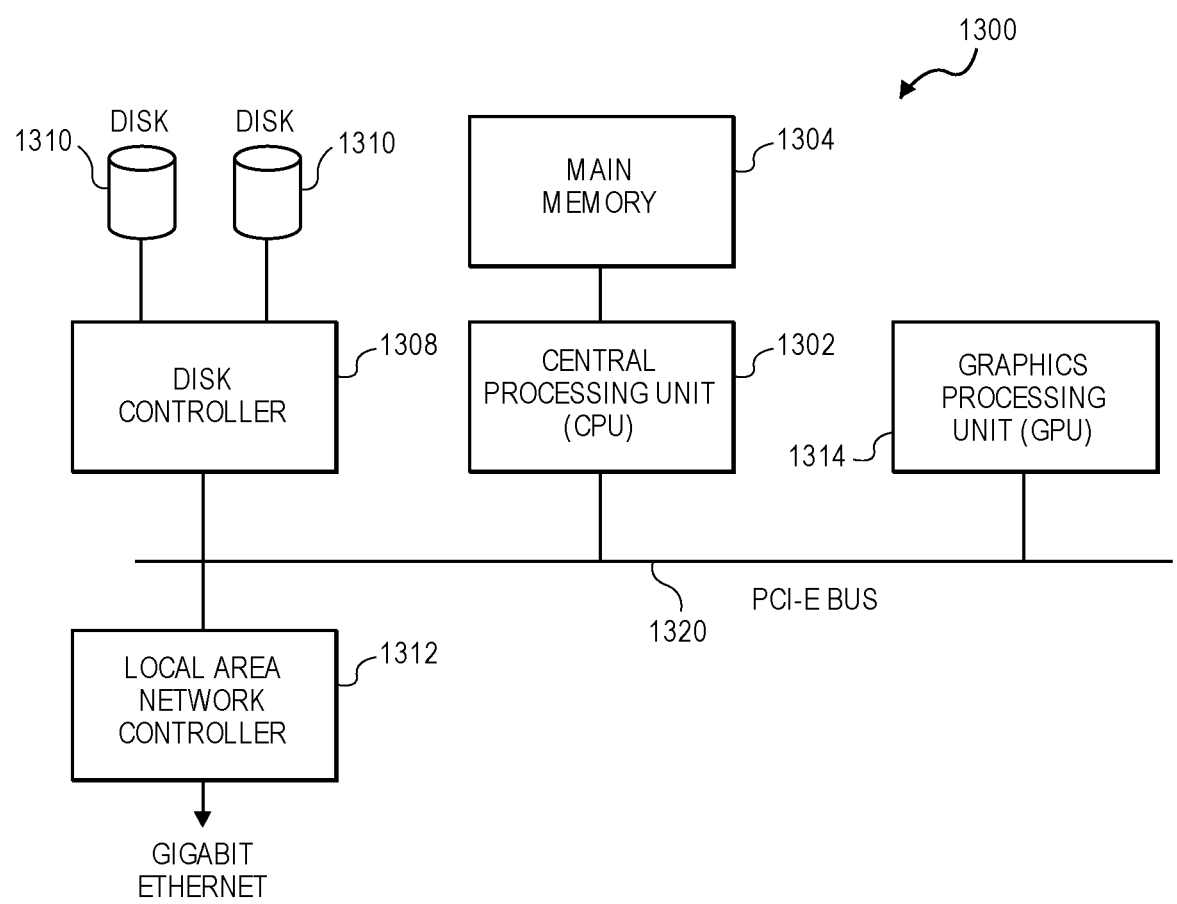
FIG. 13 is a block diagram of an embodiment of a computing hardware system that may be used in embodiments of the present disclosure.

FIG. 13 is a block diagram of an example of a computing hardware device 1300 that may be used to perform the calculations described in this disclosure. Computing hardware device 1300 comprises a central processing unit (CPU) 1302, with attached main memory 1304. The CPU 1302 may comprise, for example, eight processing cores, thereby enhancing performance of any parts of the computer software that are multi-threaded. The size of main memory 1304 may be, for example, 64 G-Bytes. The CPU 1302 is connected to a Peripheral Component Interconnect Express (PCIe) bus 1320. A graphics processing unit (GPU) 1314 may also be connected to the PCIe bus 1320. In computing hardware device 1300, the GPU 1314 may or may not be connected to a graphics output device such as a video monitor. If not connected to a graphics output device, GPU 1314 may be used purely as a high-speed parallel computation engine. The computing software may obtain significantly higher performance by using GPU 1314 for a portion of the calculations, compared to using CPU 1302 for all the calculations. The CPU 1302 communicates with the GPU 1314 via PCIe bus 1320. In other embodiments (not illustrated) GPU 1314 may be integrated with CPU 1302, rather than being connected to PCIe bus 1320. Disk controller 1308 may also be attached to the PCIe bus 1320, with, for example, two disks 1310 connected to disk controller 1308. Finally, a local area network (LAN) controller 1312 may also be attached to the PCIe bus, and provide Gigabit Ethernet (GbE) connectivity to other computers. In some embodiments, the computer software and/or the design data are stored on disks 1310. In other embodiments, either the computer programs or the design data or both the computer programs and the design data may be accessed from other computers or file serving hardware via the GbE Ethernet or other connectivity solutions such as Infiniband.

Figure 14:
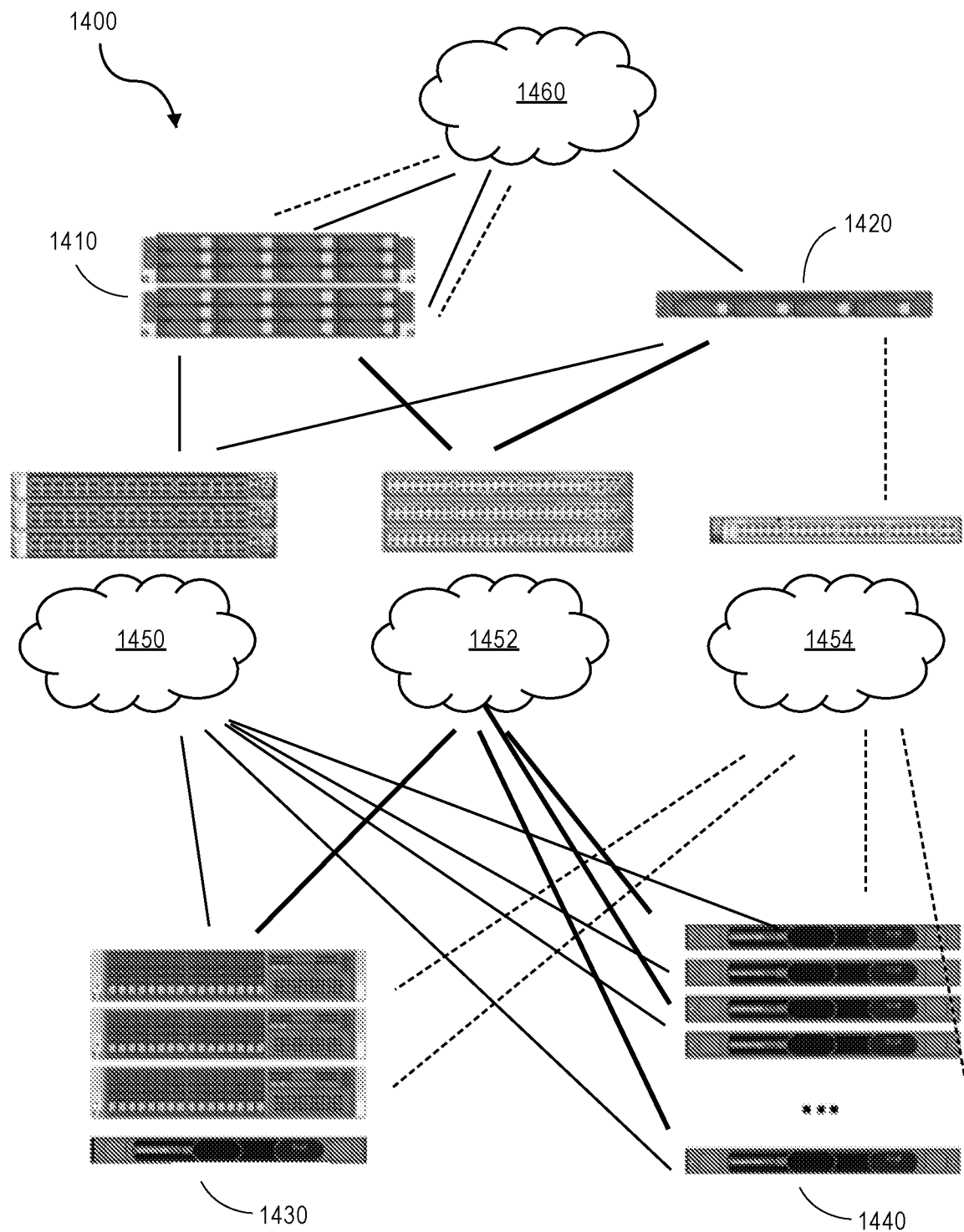
FIG. 14 is a block diagram of another embodiment of a computing hardware system, a Computational Design Platform (CDP), that may be used in embodiments of the present disclosure.

FIG. 14 is another embodiment of a system for performing the computations of the present embodiments. The system 1400 may also be referred to as a Computational Design Platform (CDP), and includes a master node 1410, an optional viewing node 1420, an optional network file system 1430, and a GPU-enabled node 1440. Viewing node 1420 may not exist or instead have only one node, or may have other numbers of nodes. GPU-enabled compute node 1440 can include one or more GPU-enabled nodes. Each GPU-enabled compute node 1440 may be, for example, a GPU, a CPU, a paired GPU and CPU, multiple GPUs for a CPU, or other combinations of GPUs and CPUs. The GPU and/or CPU may be on a single chip, such as a GPU chip having a CPU that is accelerated by the GPU on that chip, or a CPU chip having a GPU that accelerates the CPU. A GPU may be substituted by other co-processors.

The master node 1410 and viewing node 1420 may be connected to network file system 1430 and GPU-enabled compute nodes 1440 via switches and high-speed networks such as networks 1450, 1452 and 1454. In an example embodiment, networks 1450 can be a 56 Gbps network, 1452 can be a 1 Gbps network and 1454 can be a management network. In various embodiments, fewer or greater numbers of these networks may be present, and there may be various combinations of types of networks such as high and low speeds. The master node 1410 controls the CDP 1400. Outside systems can connect to the master node 1410 from an external network 1460. In some embodiments, a job is launched from an outside system. The data for the job is loaded onto the network file system 1430 prior to launching the job, and a program is used to dispatch and monitor tasks on the GPU-enabled compute nodes 1440. The progress of the job may be seen via a graphical interface, such as the viewing node 1420, or by a user on the master node 1410. The task is executed on the CPU using a script which runs the appropriate executables on the CPU. The executables connect to the GPUs, run various compute tasks, and then disconnect from the GPU. The master node 1410 can also be used to disable any failing GPU-enabled compute nodes 1440 and then operate as though that node did not exist.

In some embodiments, a system for reticle enhancement technology includes a computer processor configured to receive a target wafer pattern to be used in reticle enhancement technology; and calculate a function sample array (FSA) for the target wafer pattern, the FSA for the target wafer pattern being a smooth function. The computer processor is also configured to calculate a continuous tone mask (CTM), where the CTM is represented as a smooth function captured as a function sample array (FSA); and to compare the target wafer pattern to a predicted wafer pattern produced by the CTM. In further embodiments, the target wafer pattern is divided into a plurality of tiles, and the computer processor is further configured to compute a cost and derivative data for each tile in the plurality of tiles, the computing of the plurality of tiles being performed in a distributed process. The cost and the derivative data are based on comparing the target wafer pattern and the predicted wafer pattern produced by the CTM. The computer processor is also configured to calculate a quantized tone mask (QTM), where the QTM is derived from the optimized CTM and is represented as a smooth function captured as a function sample array (FSA).

In general embodiments, the system is a computer processor, which in some embodiments can include graphical processing units or other co-processors for performing distributed computation, such as parallel processing. In some embodiments, the graphical processing units or other co-processors may be configured to interconnect with each other for fast communication. The computer processor is configured to receive a target pattern to be used in reticle enhancement technology, and generate a target pattern function for the target wafer pattern, where the target pattern function is an FSA. The computer processor is also configured to generate a CTM and compare the target pattern function to a predicted pattern function produced by the CTM. The CTM is a smooth function. The computer processor is also configured to generate a QTM from the optimized CTM. The QTM can be represented as a smooth function.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method for iteratively optimizing a proposed lithographic mask, the method comprising:
   a) dividing the proposed lithographic mask into a plurality of proposed mask tiles;
   b) inputting a pre-determined maximum number of iterations;
   c) for each proposed mask tile in the plurality of proposed mask tiles, determining a halo area around the proposed mask tile, wherein the halo area comprises portions of adjacent proposed mask tiles, wherein the proposed mask tile including the halo area comprises an extended tile;
   d) iteratively optimizing the extended tile, wherein each iteration comprises:
      d1) performing one iteration of optimization for the extended tile;
      d2) repeating step d1) if (i) the extended tile after performing step d1) does not satisfy a cost criteria, and if (ii) a number of iterations for the extended tile is less than the pre-determined maximum number of iterations, wherein optimizing the extended tile produces a predicted substrate pattern at a perimeter of the proposed mask tile that matches adjacent predicted substrate patterns that are calculated at perimeters of adjacent proposed mask tiles; and
   e) after completing step d) for the plurality of proposed masked tiles, combining the plurality of proposed mask tiles into an optimized proposed mask.

2. The method of claim 1, further comprising repeating steps b), d) and e) to refine optimization.

3. The method of claim 1, further comprising inputting a target substrate pattern.

4. The method of claim 3, wherein the iterations for the extended tile are performed on a computing platform having an aggregate total memory of one or more nodes of the computing platform, wherein a single node of the computing platform holds the target substrate pattern for the area of the extended tile.

5. The method of claim 3, further comprising representing the extended tile as either a continuous tone mask (CTM) smooth function captured as a function sample array (FSA)

or a quantized tone mask (QTM) smooth function captured as an FSA, wherein the FSA for the CTM or the QTM is an array of function values which can be real numbers, complex numbers, or an aggregate of numbers.

6. The method of claim 5, wherein the cost criteria comprises:
calculating a cost and a derivative data, the cost and the derivative data being based on comparing the predicted substrate pattern to the target substrate pattern for the extended tile, wherein the cost is also represented as a smooth function; and
updating the CTM or the QTM with the cost and the derivative data.

7. The method of claim 6, wherein a sharp threshold is applied to the QTM to extract contours to secure geometric shapes for the optimized proposed mask.

8. The method of claim 3, further comprising representing the target substrate pattern as a function sample array (FSA), wherein the representing of the target substrate pattern as an FSA comprises applying a low-pass filter to the target substrate pattern.

9. The method of claim 8, wherein the FSA for the target substrate pattern is band-limited to a spatial frequency cutoff of a substrate lithography system, and is sampled on a grid that meets a Nyquist criterion.

10. The method of claim 3, wherein the target substrate pattern is for a mask layer of a semiconductor chip.

11. The method of claim 1, wherein the halo area has a width around the proposed mask tile that is 1.5 to 4 times a lithographic imaging proximity range cutoff of a pre-determined substrate lithography system for each iteration.

12. The method of claim 1, further comprising dividing the extended tile into one or more partitions.

* * * * *